CHARACTER RECOGNITION ELECTRICAL DE-CODER SYSTEM

Filed Nov. 18, 1957 Sheet 1 of 13

INVENTOR
CEBERN B. TRIMBLE

BY Louis A. Kline
Cavender
THEIR ATTORNEYS

INVENTOR
CEBERN B. TRIMBLE

BY Louis A. Kline
Cavender

THEIR ATTORNEYS

INVENTOR
CEBERN B. TRIMBLE

BY Louis A Kline
J. Lavender
THEIR ATTORNEYS

INVENTOR
CEBERN B. TRIMBLE

BY Louis A Kline
J. Cavender

THEIR ATTORNEYS

INVENTOR
CEBERN B. TRIMBLE
BY Louis A Kline
[signature]
THEIR ATTORNEYS

INVENTOR
CEBERN B. TRIMBLE
BY Louis A Kline
[signature]
THEIR ATTORNEYS

INVENTOR
CEBERN B. TRIMBLE
BY Louis A Kline
J Haeunder
THEIR ATTORNEYS

INVENTOR
CEBERN B. TRIMBLE

BY Louis A Kline
J Hauender
THEIR ATTORNEYS

INVENTOR
CEBERN B. TRIMBLE

BY Louis A. Kline
J. Cavender
THEIR ATTORNEYS

INVENTOR
CEBERN B. TRIMBLE
BY Lucio A Kline
Hauender
THEIR ATTORNEYS

INVENTOR
CEBERN B. TRIMBLE

BY Louis A Kline
[signature]
THEIR ATTORNEYS

INVENTOR
CEBERN B. TRIMBLE

BY Louis A. Kline
J. Lavender
THEIR ATTORNEYS

INVENTOR
CEBERN B. TRIMBLE
BY Louis A Kline
J. Lavender
THEIR ATTORNEYS 3,439,337
CHARACTER RECOGNITION ELECTRICAL DE-CODER SYSTEM Cebern B. Trimble, Dayton, Ohio, assignor to The National Cash Register Company, Dayton, Ohio, a corporation of Maryland Filed Nov. 18, 1957, Ser. No. 697,230
Int. Cl. G06k 9/06
U.S. Cl. 340—146.3 6 Claims The present invention relates generally to direct-character recognition systems. More particularly the invention relates to new and improved apparatus for selectively identifying a plurality of intermixed recorded characters such as numerals, letters of the alphabet, and symbols, in a simple and economical manner and which is readily adaptable for incorporation in present-day computers and data processors.

Even though it is quite difficult to define the limits of application of computers and data processors to the problems encountered in everyday business operations, one of the most important fields of application lies in the control of business transactions. In the past, such control was achieved largely by manually produced and handled documents which necessitated a great deal of clerical effort. However, the modern trend has been toward the use of computers and data processors connected either singly or in various combinations to automatically perform the chores of preparing payrolls, inventories, sorting and handling checks and other bills of exchange, and gathering statistical data of many types. As a result of the increased use of such automation devices, the cost and manpower required to perform some of these necessary tasks have greatly been reduced.

One of the difficulties, however, which has seriously limited the application of these devices to business problems lies in the fact that information in non-coded human language, such as is normally found on typewritten or printed business documents, cannot be utilized by these machines without being first translated into a language which they "understand." As a considerable amount of manual transcription is generally required to process the data accordingly before it is fed into and utilized by these machines, it becomes highly desirable that the data be compatible both for the machine and the human being in order to attain the desired gains in speed and reliability of the computers and data processors, and at the same time, greatly reduce the time required for manual transcription.

The known devices for identifying printed characters, such as letters of the alphabet, numerals and symbols, may be classified into four general groups: in the first group, identification occurs by means of auxiliary symbols in the forms of dots or areas of different sizes and/or arranged in different preselected positions in accordance with a predetermined code. The second group identifies the individual characters by their varying degrees of boldness or total reflected area. Consequently, characters printed with the same degree of boldness, due to overprinting "equeeze-out," or the like, are indistinguishable by the machine and thus are all recognized as one and the same. These first two mentioned groups do not represent any actual identification, since in these cases the actual character may be completely lacking, and consequently, the groups may be thought of as being of the "code recognition" type.

In the third group, the identification results by comparison of the character to be identified with a reference master. In this instance, either the entire configuration or individual parts thereof are compared with the aid of patterns, templets, masks, and the like, such that when the characters coincide with their respective reference masters, photoelectric cells are affected for the production of audible sounds, motion of type bars, and other interpretive devices.

With this system of identification, it is necessary that the characters always appear in the same external form for the reason that differentiation without regard to the size or relative position of the characters causes the device to fail.

In the fourth and most promising group, there is generated in response to the area configuration of each character, an electrical signal which possesses a wave-shape characteristic respectively representative of that particular character. The areas thus confined by the positive and negative excursions of each signal wave, as individually seen by a plurality of correlation networks numbering one for each character, are effectively added in each network to produce an output voltage corresponding to the total area encompassed by the signal as seen by that particular network. A reference voltage, corresponding to the network output voltage having the greatest amplitude, is first derived and then simultaneously compared with the output voltage from each of the correlation networks. Character identification is then made on the basis of the comparison of each of the output voltages from the correlation networks with the reference voltage such that a character identification signal is generated from only that correlation network whose output exceeds the magnitude of the reference potential.

Even though such a system possesses many desirable features, it nevertheless necessitates extremely complex circuitry which, not only is more costly, but in addition, is more susceptible to malfunction. Such a system also chronization and timing signals by the character detection and identification circuitry, which, again, is highly undesirable.

Therefore, one of the objects of the present invention is to devise a new and improved direct-character recognition apparatus which obviates the above-mentioned undesirable features.

Another object of the present invention is to devise such a new and improved direct-character recognition apparatus which is self-clocking and does not require any externally-generated timing or synchronizing signals.

A further object of the present invention is to devise such a direct-character recognition apparatus which selectively and positively identifies, in an extremely simple manner, intermixed recorded characters comprising numerals, letters of the alphabet, and various symbols.

Another object of the present invention is to devise a new and improved direct-character recognition apparatus which is inherently capable of recognizing intermixed characters, each of which having been printed with a different ink intensity.

A correlary object of the present invention is to devise a simple, yet highly effective, direct-character recognition apparatus which is readily adaptable for incorporation in present-day computers and data processors.

In accordance with a broad aspect of the present invention, apparatus for selectively identifying a plurality of recorded characters comprises means sequentially responsive to the characters for generating a sequence of electrical signals, each of which possesses a wave-shaped characteristic respectively representative of a corresponding character. Storage means is coupled to the generating means for sequentially receiving the signals one after the other, and for dispensing samples of each of the signals at a plurality of predetermined time-base intervals. A plurality of character-identifying means, each related to a different one of the characters, are each coupled to the sample dispensing means to have continually impressed thereon predetermined ones of the signal samples according to its related character. Each of the character-identifying means includes collating means for examining only the signal samples impressed thereon and producing a character-identifying output signal when the examined samples correspond to the related character of that particular collating means.

In accordance with a more specific aspect of the present invention, apparatus for identifying a recorded characters comprises means responsive to the character for generating an eelctrical signal having a characteristic wave-shape exhibiting a plurality of positive and negative excursions collectively representative of the character. Storage means is coupled to the generating means for receiving the signal and for dispensing positive and negative potential samples of the signal excursions at a plurality of predetermined time-base intervals. A character-identifying means is coupled to the storage means to have impressed thereon predetermined ones of the positive and negative potential samples according to the character. The identifying means includes a first plurality of impedance elements each connected to the storage means to have a predetermined one of the potential samples impressed thereacross, and a second plurality of impedance elements each connected to a source of reference potential. The identifying means further includes a first coupling means connecting an impedance element of the first plurality having a positive potential sample impressed thereacross with an impedance element of the first plurality having a negative potential sample impressed thereacross. The identifying means still further includes a second coupling means connecting an impedance element of the first plurality with an impedance element of the second plurality for comparing the potential samples with respect to one another and also for comparing the potential samples with respect to a reference potential to produce a character-identifying output signal only when the potential samples correspond to the character.

The novel features of the invention, as well as the invention itself, both as to its organization and method of operation will best be understood from the following description, when read in connection with the accompanying drawings, wherein like reference characters refer to like or similar parts and in which:

FIG. 1 is a diagrammatic representation, partly in schematic, illustrating a simplified direct-character recognition apparatus constructed in accordance with the present invention;

FIGS. 2*a* through 2*k* illustrate the respective characteristic wave-shapes of the electrical signals associated with and corresponding to numerals 0 through 9, and one illustrative symbol;

FIGS. 7*a* through 7*k* depict the instantaneous potentials appearing on the various taps of the delay line storage device during presence of each of the respective electrical signals associated with and corresponding to numerals 0 through 9 and one illustrative symbol; and FIGS. 8 to 18 are schematic representations of the various character-identifying networks associated with and corresponding to numerals 0 through 9 and one illustrative symbol in accordance with a preferred embodiment of the present invention.

Figure 1:
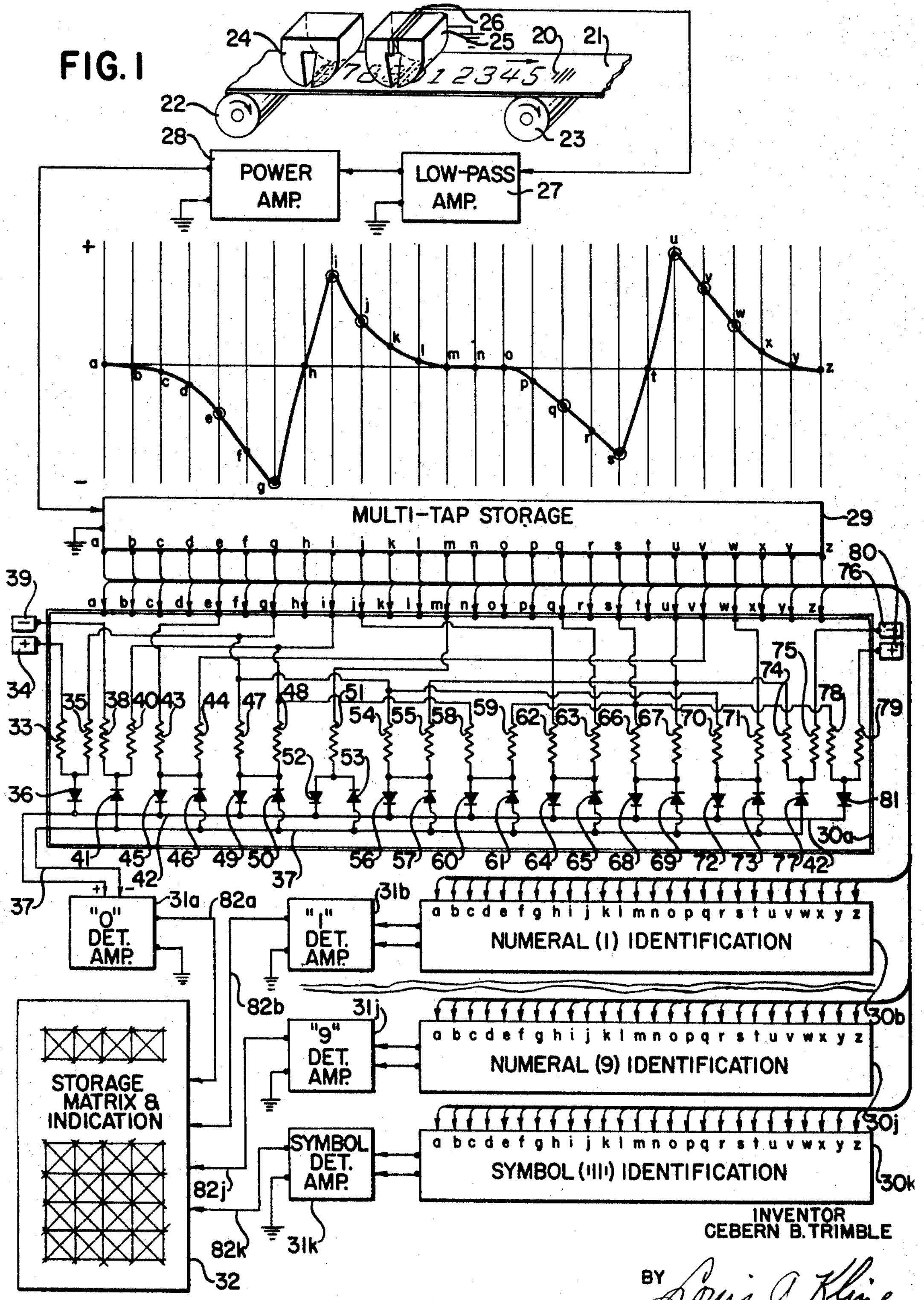

With reference to FIG. 1 of the drawings, there is shown a simplified block diagram, partly in schematic, of a direct-character recognition apparatus constructed in accordance with the present invention. For illustrative purposes only, a plurality of characters comprising numerals 0 through 9 and a single representative symbol 20 are shown recorded on a document such as tape 21. The characters are preferably printed with an ink containing a suitable magnetic pigment of ferric oxide which is commonly used in the preparation of present-day magnetic tapes. A tape transport means is not shown in detail but includes suitable tape guides, pressure rollers, and driving capstans 22 and 23, which drives tape 21 from left to right as indicated by the arrows to sequentially translate the printed characters at a constant velocity across the gaps of magnetizing head 24 and read head 25.

In passing the magnetic characters through the field of a permanent magnet, such as magnetizing head 24, the printed area of each character is magnetically polarized in a direction parallel to the movement of the tape. Consequently, as each character is translated across the air gap of read head 25, an electrical signal is generated in output coil 26 wound about the body of read head 25; the instantaneous amplitude of the electrical signal thus generated, varies, in a first approximation, to the integrated plane area of the character as it passes across the air gap of the read head. As shown in FIGS. 2*a* through 2*k*, each signal, corresponding to numerals 0 through 9 and representative symbol 20, possesses a wave-shape characteristic comprising a plurality of positive and negative-going excursions which are collectively representative of that particular character. All of the characters, thus illustrated, are shown printed in style K-type printing as tentatively adopted by the American Banking Association for use in automation of banking operations. Even though this type of character stylization may be desirable from a particular commercial application standpoint, any number of a multitude of other types of stylization may be utilized by the present invetnion with equal success.

As the layer of printed ink for each character is but a fraction of a thousandth of an inch thick and consequently contains a very small amount of magnetic oxide, and also, as the characters pass over the read head at a rate of approximately 1200 per second, the amplitude of the signals generated in output winding 26 are in the neighborhood of but a few hundred micro-volts peak-to-peak. In addition, as the high frequency components of the signals have been found to possess less reliable decoding characteristics than the low frequency components, the signals are fed into low pass amplifier 27 wherein the low frequency components are amplified and the high frequency components attenuated. The output from amplifier 27 is coupled to the input of power amplifier 28 wherein the low frequency components of the signals are further amplified to an amplitude of approximately 200 volts peak-to-peak. The output from amplifier 28 is connected to the input of a suitable storage device which is shown, in this instance, as a lumped-constant delay line 29 possessing essentially zero attenuation and linear phase shift characteristics within the band-width of the low frequency components of the signals used. Delay line 29 is provided with a plurality of equal-interval time-spaced output taps *a* through *z* and consequently is of the series-input parallel-output variety. By means of output taps *a* through *z*, delay line 29 is capable of sampling each of the signals at a plurality of equally spaced time-base intervals as they sequentially propagate throughout the length of the delay line. In order to prevent loading of the delay line taps during operation, it may be desirable to insert a cathode-follower type amplifier intermediate output taps *a* through *z* and the corresponding delay line taps as will more fully be shown and described hereafter.

From the delay line onward, the circuitry is divided into a plurality of separate channels equal to the number and individually corresponding to the characters to be decoded. At the beginning of each channel is a collating network 30 which continually examines preselected ones of the sample points of delay line 29, according to its related character, and produces a character-identifying output signal whenever the examined samples correspond to its related character. In other words, each of the collating networks is continually "looking" at the contents of delay line 29 and whenever either of the networks "sees" a signal therein corresponding to its related character, only that particular network will immediately give forth with a character-identifying output signal, indicating that the character has been recognized. Consequently, as each network is continually looking at the contents of the delay line, the need for any type of synchronization or timing signals is obviated.

The output signal from each collating network is fed into a detector-amplifier 31 which effects storage of that particular character-idetnification signal in storage matrix 32. The signal or signals, thus stored, may either be used directly or at some later time to control the motion of type bars or other interpretive devices corresponding to characters thus "recognized" and identified.

As all of the just-mentioned collating networks are essentially of identical circuit configuration and differ only in rsepect to the absolute values of the various circuit components, only zero collating network **30*a* has representatively been chosen to be shown and described schematically in detail. It will be obvious to those skilled in the art after possessing a clear understanding of the principles employed in the design of zero collating network 30*a*** in accordance with the present invention, that any of a multitude of other collating networks may be constructed similarly, to decode and identify any of a plurality of alphabetical, numerical or symbolic characters.

Collating network **30*a* is described as follows: A resistor 33 is connected to a source of positive unidirectional reference potential 34, commonly designated B+. The opposite end of resistor 33 is connected to resistor 35**, the opposite end of which is connected to output tap *g* of delay line 29. The anode of diode 36 is connected to the junction of resistors 33 and 35 and the cathode thereof is connected to a common operating line 42. Resistor 38 is connected to a source of negative unidirectional reference potential 39, commonly designated B−. The opposite end of resistor 38 is connected to resistor 40, the opposite end of which is connected to output tap *i* of delay line 29. The cathode of diode 41 is connected to the junction of resistors 38 and 40 and the anode thereof is returned to common operating line 37. Resistor 43 is connected to output tap *e* of the delay line and the opposite end thereof is connected to resistor 44, the opposite end of which is connected to output tap *v* of the delay line. The anode of diode 45 and the cathode of diode 46 are each connected to the junction of resistors 43 and 44. The cathode of diode 45 is returned to line 42, whereas the anode of diode 46 is returned to line 37. Resistor 47 is connected to output tap *g* of the delay line and the opposite end thereof is connected to resistor 48, the opposite end of which is connected to output tap *i* of the delay line. The anode of diode 49 and the cathode of diode 50 are each connected to the junction of resistors 47 and 48. The cathode of diode 49 is returned to line 42, whereas the anode of diode 50 is returned to line 37. Resistor 51 is connected to output tap *m* of the delay line and the opposite end thereof is connected to the anode of diode 52 and to the cathode of diode 53. The cathode of diode 52 is returned to line 42, whereas the anode of diode 53 is returned to line 37. Resistor 54 is connected to output tap *g* of the delay line and the opposite end thereof is connected to resistor 55, the opposite end of which is connected to output tap *u* of the delay line. The anode of diode 56 and the cathode of diode 57 are each connected to the junction of resistors 54 and 55. The cathode of diode 56 is returned to line 42, whereas the anode of diode 57 is returned to line 37. Resistor 58 is connected to output tap *i* of the delay line and the opposite end thereof is connected to resistor 59, the opposite end of which is connected to output tap *s* of the delay line. The anode of diode 60 and the cathode of diode 61 are each connected to the junction of resistors 58 and 59. The cathode of diode 60 is returned to line 42, whereas the anode of diode 61 is connected to line 37. Resistor 62 is connected to output tap *j* of the delay line and the opposite end thereof is connected to resistor 63, the opposite end of which is connected to output tap *q* of the delay line. The anode of diode 64 and the cathode of diodes 65 are connected to the junction of resistors 62 and 63. The cathode of diode 64 is returned to line 42, whereas the anode of diode 65 is returned to line 37. Resistor 66 is connected to output tap *s* of the delay line and the opposite end thereof is connected to resistor 67, the opposite end of which is connected to output tap *u* of the delay line. The anode of diode 68 and the cathode of diode 69 are each connected to the junction of resistors 66 and 67. The cathode of diode 68 is returned to line 42, whereas the anode of diode 69 is returned to output line 37. Resistor 70 is connected to output tap *g* of the delay line and the opposite end thereof is connected to resistor 71, the opposite end of which is connected to output tap *w* of the delay line. The anode of diode 72 and the cathode of diode 73 are each connected to the junction of resistors 70 and 71. The cathode of diode 72 is returned to output line 42, whereas the anode of diode 73 is returned to output line 37. Resistor 74 is connected to output tap *u* of the delay line and the opposite end thereof is connected to resistor 75, the opposite end of which is connected to a source of negative unidirectional reference potential 76, commonly designated B−. The cathode of diode 77 is connected to the junction of resistors 74 and 75 and the anode thereof is returned to output line 37. And finally, resistor 78 is connected to output tap *s* of the delay line and the opposite end thereof is connected to resistor 79, the opposite end of which is connected to a source of positive unidirectional reference potential 80, commonly designated B+. The anode of diode 81 is connected to the junction of resistors 78 and 79 and the cathode thereof is connected to operating line 42.

Figure 2A:
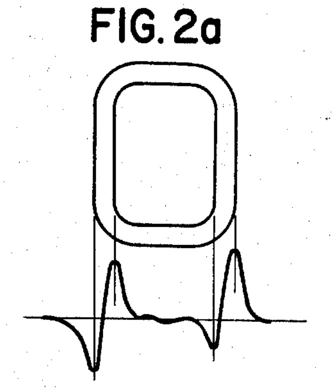
Figure 2E:
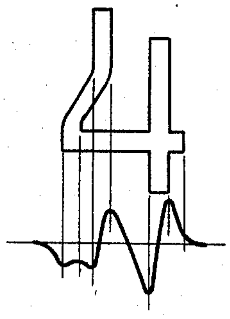
Figure 2I:
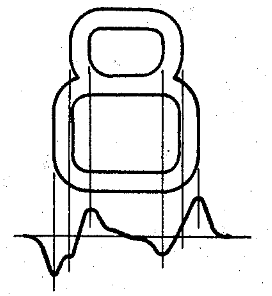
Figure 2B:
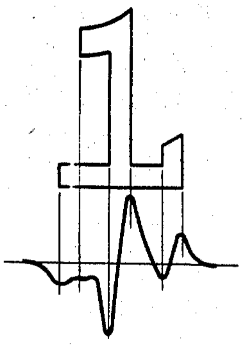
Figure 2F:
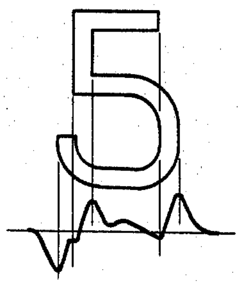
Figure 2J:
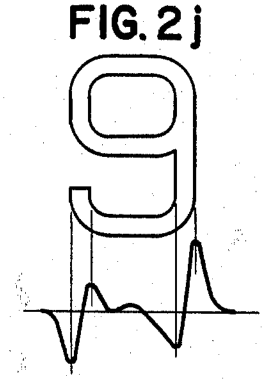
Figure 2G:
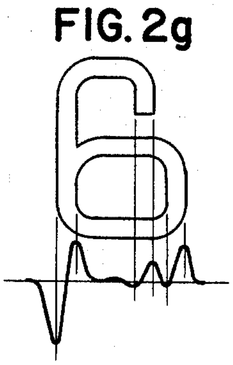
Figure 2K:
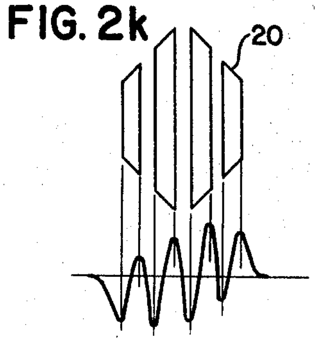
Figure 2C:
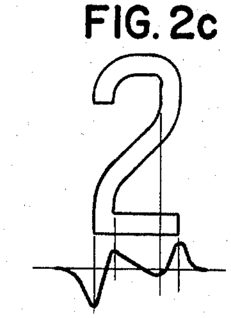
Figure 2D:
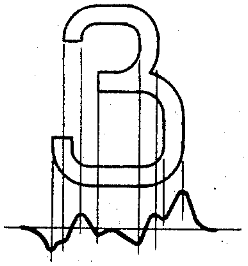
Figure 2H:
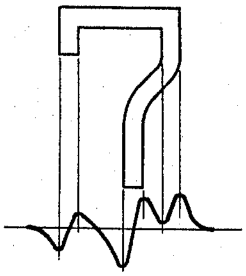

In operation, it has been assumed that tape 21 is moving from left to right at a constant velocity and the numeral (zero) has just passed over the air gap of pickup head 25. Consequently, an electrical signal is generated from the zero character in a manner just described and possesses a wave-shape characteristic corresponding to the zero character as shown in FIG. 2*a* of the drawings. The signal, thus generated, passes through amplifiers 27 and 28, wherein it is amplified to a proper amplitude and the high frequency components thereof removed. After the signal has propagated down and is centered in delay line 29, the instantaneous potential distribution at that moment along output taps *a* through z is as illustrated in the graph drawn directly above delay line 29 for the purpose of clarity.

As the upper ends of resistors 47 and 48, as viewed, are respectively connected to output taps *g* and *i* of the delay line, resistors 47 and 48 form a bridge network connecting the potential of the negative excursion at tap *g* with the potential of the positive excursion at tap *i*. The values of resisors 47 and 48 are chosen such that the absolute value of the expected potential at tap *g* multiplied by the value of resistor 48 is equal to the absolute value of the expected potential at tap *i* multiplied by the value of resistor 47. For example, assuming the expected potentials at taps *g* and *i* to be minus 8 units and plus 6 units, respectively, the value of resistor 48 would be 1.33 times the value of resistor 47. The most important consideration is the ratio of the values of resistors 47 and 48 rather than their actual values.

Therefore, if the expected wave-form of the signal corresponding to the zero character is such that the ratio of the absolute values of the potentials at taps *g* and *i* is equal to 1.33 (minus 8 units and plus 6 units, respectively, or any multiples thereof) as the ratio of the value of resistor 48 to resistor 47 is also 1.33, the potential appearing at the junction of resistors 47 and 48 is zero. Thus, in effect, the potential at tap *g* is compared with the potential at tap *i* and the result of the comparison is a zero potential indicating that the potentials at taps *g* and *i* are of proper ratio. However, when either the potential at tap *i* is more positive than expected, or the potential at tap *g* is less negative than expected, the potential at the junction of resistors 47 and 48 is no longer zero, but instead is at a positive potential proportional to the degree of departure of either tap potential from the expected value. By the same token, when either the potential at tap *i* is less positive than expected, or the potential at tap *g* is more negative than expected, the potential at the junction of resistors 47 and 48 is, again, no longer zero but instead is of a negative potential proportional to the degree of departure of either tap potential from the expected value. When the junction of resistors 47 and 48 is at a negative potential, diode 50 conducts and applies the same negative potential to line 37, neglecting the potential drop across diode 50; whenever the junction is at a positive potential, diode 49 conducts and applies the same positive potential to line 42, neglecting the potential drop across diode 49; and whenever the junction is at a zero potential, diodes 49 and 50 both remain nonconductive and the potential appearing on each of lines 37 and 42 is zero.

The just described considerations given to the determination of the values of resistors 47 and 48 in conjunction with taps *g* and *i* are also given to the remaining bridge networks wherein resistors 43 and 44 compare the expected potential of the leading portion of the first negative excursion at tap *e* with the expected potential of the decay portion of the second positive excursion at tap *v*; resistors 54 and 55 compare the expected potential of the first negative excursion at tap *g* with the expected potential of the second positive excursion at tap *u*; resistors 58 and 59 compare the expected potential of the first positive excursion at tap *i* with the expected potential of the second negative excursion at tap *s*; resistors 62 and 63 compare the expected potential of the decay portion of the first positive excursion at tap *j* with the expected potential of the leading portion of the second negative excursion at tap *q*; resistors 66 and 67 compare the expected potential of the second negative excursion at tap *s* with the expected potential of the second positive excursion at tap *u*; and resistors 70 and 71 compare the expected potential of the first negative excursion at tap *g* with the expected potential of the decay portion of the second positive excursion at tap *w*.

It can now be seen that as long as the potential at each and every junction of resistors 43–44, 47–48, 54–55, 58–59, 62–63, 66–67, and 70–71 is zero, both of lines 37 and 42 are likewise at zero or "null" potential. However, when either of these junction points is at a negative potential, line 37 is likewise at a negative potential. When either of the junction points is at a positive potential, line 42 is likewise at a positive potential. And, obviously, when one or more of the junction points are negative and one or more are positive, line 37 is at a negative potential and, at the same time, line 42 is at a positive potential.

Various other check points may be provided. For example, resistor 51 is connected to tap *m* of delay line 29. As the expected wave-shape characteristic of the signal corresponding to the zero character is such that the potential at tap *m* of delay line 29 is zero when the signal is centered therein, one of diodes 52 or 53 is rendered conductive if the potential at tap *m* is other than zero to inhibit and thus remove one of lines 37 or 42 from its null condition.

As it is also possible to get a null on lines 37 and 42 whenever a character is completely missing from delay line 29, resistors 35 and 33 compare the potential of the first negative excursion at tap *g* with a positive unidirectional reference potential supplied by source 34; resistors 38 and 40 compare the potential of the first positive excursion at tap *i* with a negative unidirectional reference potential supplied by source 39; resistors 74 and 75 compare the potential of the second positive excursion at tap *u* with a negative unidirectional reference potential supplied by source 76; and resistors 78 and 79 compare the potential of the second negative excursion at tap *s* with a positive unidirectional reference potential supplied by source 80.

Thus, as long as the junctions of resistors 33–35 and 78–79 are at a zero or some negative potential, diodes 36 and 81 remain nonconductive. However, if either of these junctions is at a positive potential, the respective diode conducts and line 42 is then at a positive potential. By the same token, as long as the junction of resistors 38–40 and 74–75 are at a zero or some positive potential, diodes 41 and 77 remain nonconductive. If either of these junctions is at a negative potential, the respective diodes conduct and line 37 is then at a negative potential. In order to support a broad printing tolerance of the characters and to take care of any changes in amplification of amplifiers 27 and 28, which effect the overall magnitude of the electrical signal in delay line 29, it is preferred that the various reference voltages from sources 34, 39, 76, and 80, or the ratios of the values of resistors 33–35, 38–40, 74–75 and 78–79 be such that the potentials at the junctions of resistors 35–33 and 78–79 are slightly negative and the potentials at the junctions of resistors 38–40 and 74–75 are slightly positive. This allows the signal amplitude in delay line 29 to decrease below nominal and still have recognition of the character, as identification thereof is made on the basis of a ratio comparison of the potentials at the various tap points of delay line 29, the absolute magnitude of the electrical signal in delay line 29 is not critical as only the characteristic wave-shape of the signal is of prime consideration.

As previously stated, the output of network **30*a* is connected to the input of detector amplifier 31*a* through lines 37 and 42. Amplifiers 31, along with amplifiers 27 and 28 and delay line 29, may be any of a multitude of conventional types and consequently a detailed description thereof is not deemed necessary. However, the construction of amplifier 31*a* is such that a character-identifying output pulse is generated therein and appears at output line 82*a* only when the potential of input line 37 is of a polarity other than negative and the potential of line 42 is simultaneously of a polarity other than positive. If either line 37 is negative or line 42 is at a positive potential, the output from amplifier 31*a* is inhibited and a character-identification pulse is not stored in matrix 32**.

From the foregoing, it can now be appreciated the self-clocking features of the novel character-identification apparatus is constructed in accordance with the present invention. The contents of the delay line is continually being analyzed in an extremely simple manner, so that whenever an electrical signal appears therein having a wave-shape characteristic corresponding to one of the characters to be identified, a character-identifying output signal is immediately generated from only that collating network which corresponds to that particular character. The apparatus therefore is self clocking, evaluates the signal wave-form with respect to potential, polarity, and time and yet does not necessitate the use of various synchronizing signals in order to get positive identification of the characters. As long as the degree of stylization of the character printing is such that the signal wave-forms associated with one character are substantially different from the other, any number of intermixed characters, such as letters of the alphabet, numerals, and symbols can be identified in a like manner as described. The differences in the various signal wave-forms dictate the number of points of comparison of the signal wave that are necessary to insure positive identification of the characters; the greater the difference, the lesser the number of points needed and the lesser the difference, the greater the number of points needed.

Figure 3:
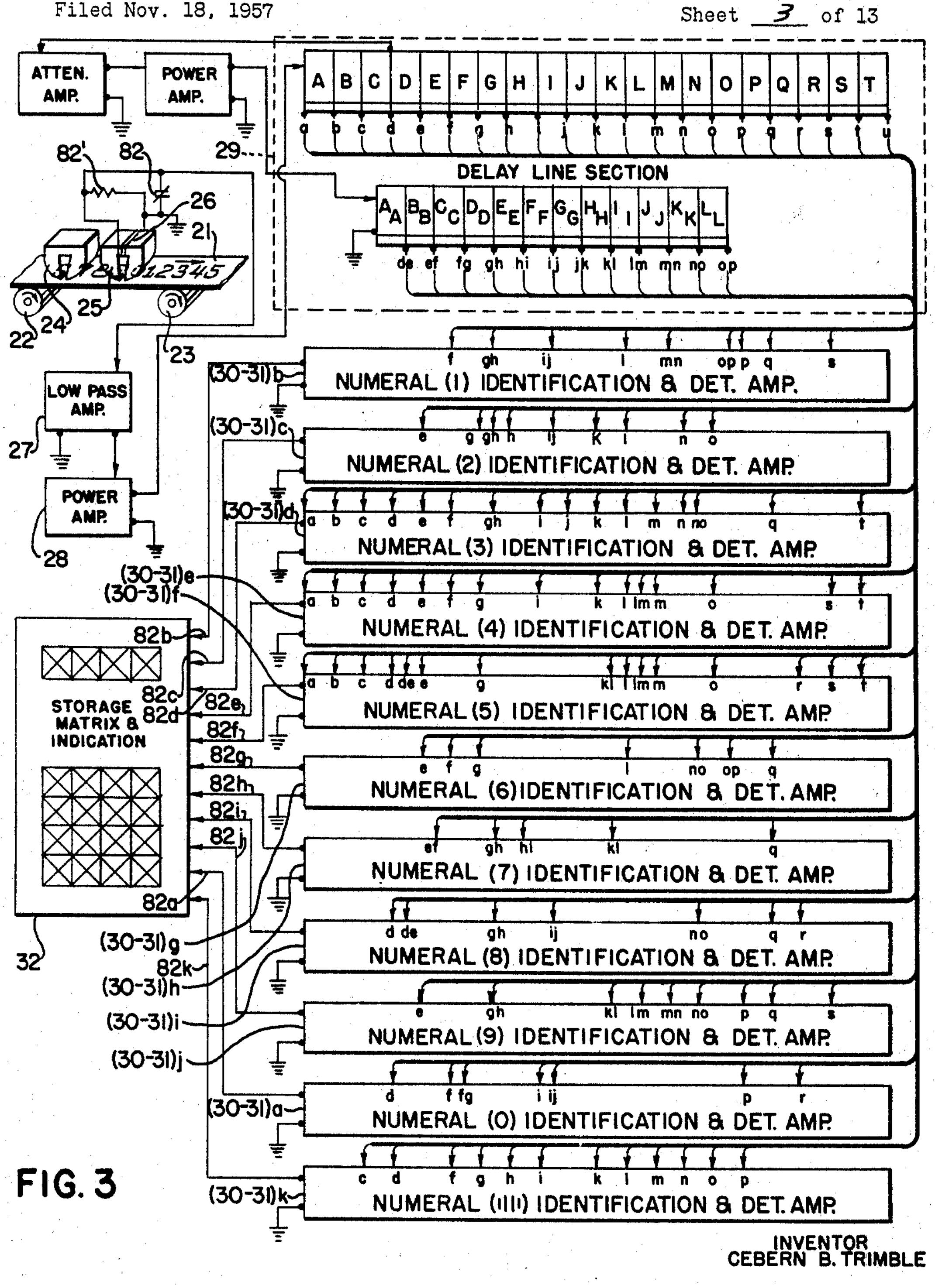
FIG. 3 is a diagrammatic representation depicting a preferred embodiment of a direct-character recognition apparatus constructed in accordance with the present invention.

With reference to FIGURE 3, there is diagrammatically illustrated a preferred embodiment of a direct-character recognition apparatus constructed in accordance with the present invention. In the preferred embodiment, the core of magnetizing head 24 is of a somewhat "horseshoe" configuration and is composed of an aluminum-nickel-cobalt magnet steel alloy commonly known as "Alnico #5." Magnetizing head 24 occupies a total volume of approximately one cubic inch and the pole pieces thereof are provided with cold rolled steel inserts which define a magnetizing gap of approximately .003 inch in width and 1.0 inch in length. Read head 25 is of the high mu magnetic variety which is manufactured by the Brush Electronics Company as Model BK–1508E–S1721, having an air gap of approximately .0005 inch in width and 1.0 inch in length. The illustrative characters comprising numerals 0 through 9 and symbol 20 may either be pre-printed by letterpress or offset printing techniques in a magnetic ink having a large B–H product such as that manufactured by the California Ink Company as M–16 or M–21 respectively. The characters also may be printed with an ordinary typewriter which utilizes a ribbon of the magnetic transfer tape variety. In this instance, the typewriter ribbon comprises a magnetic oxide dispersed in a polyethylene base and laid down on a suitably thin plastic tape known as Mylar which is manufactured by the E. I. du Pont de Nemours and Company, Inc.

The several inks which have been developed have each been tailored to transfer to the paper roughly the same amount of magnetic material. Letterpress characteristically transfers more magnetic material than does offset printing, and consequently, the offset inks, i.e. M–21 carry more magnetic oxide than do the letterpress inks, i.e. M–16. Both of these inks are designed to match the magnetic transfer tape so that all three processes give roughly the same signal amplitudes. In either process, it is highly desirable that the transfer of the magnetic ink layer be uniform; otherwise, noisy electrical signals are produced which are not uniform or easily reproducible.

As the major information carried by the signal waves derived by the pickup head 25 recurs at a relatively low repetition rate of approximately 5 kilocycles, it is preferred that pickup head 25 be tuned to resonate at a frequency of 5 kilocycles by capacitor 82 and also be critically damped by resistor 82' both of which are connected across output coil 26. Consequently, the signal-to-noise ratio of the output signal is greatly improved and the undesirable high frequency components thereof are eliminated and thus give rise to much more consistent and reproducible signals from pickup head 25.

Amplifier 27 has a relatively flat frequency response characteristic up to a frequency of 10 kilocycles; all frequencies above 10 kilocycles are sharply attenuated. As the peak-to-peak amplitude of the signal output from pickup head 25 is quite low, in the order of 500 microvolts, the voltage gain of amplifier 27 is approximately 20,000, thus giving an output voltage of approximately 10 volts peak-to-peak. Amplifier 28 likewise has a relatively flat frequency response characteristic up to a frequency of 10 kilocycles. The voltage gain of amplifier 28 is in the order of 20, thus presenting a signal wave to the input terminals of delay line 29 of approximately 200 volts peak-to-peak.

Figures 4, 5, 6:
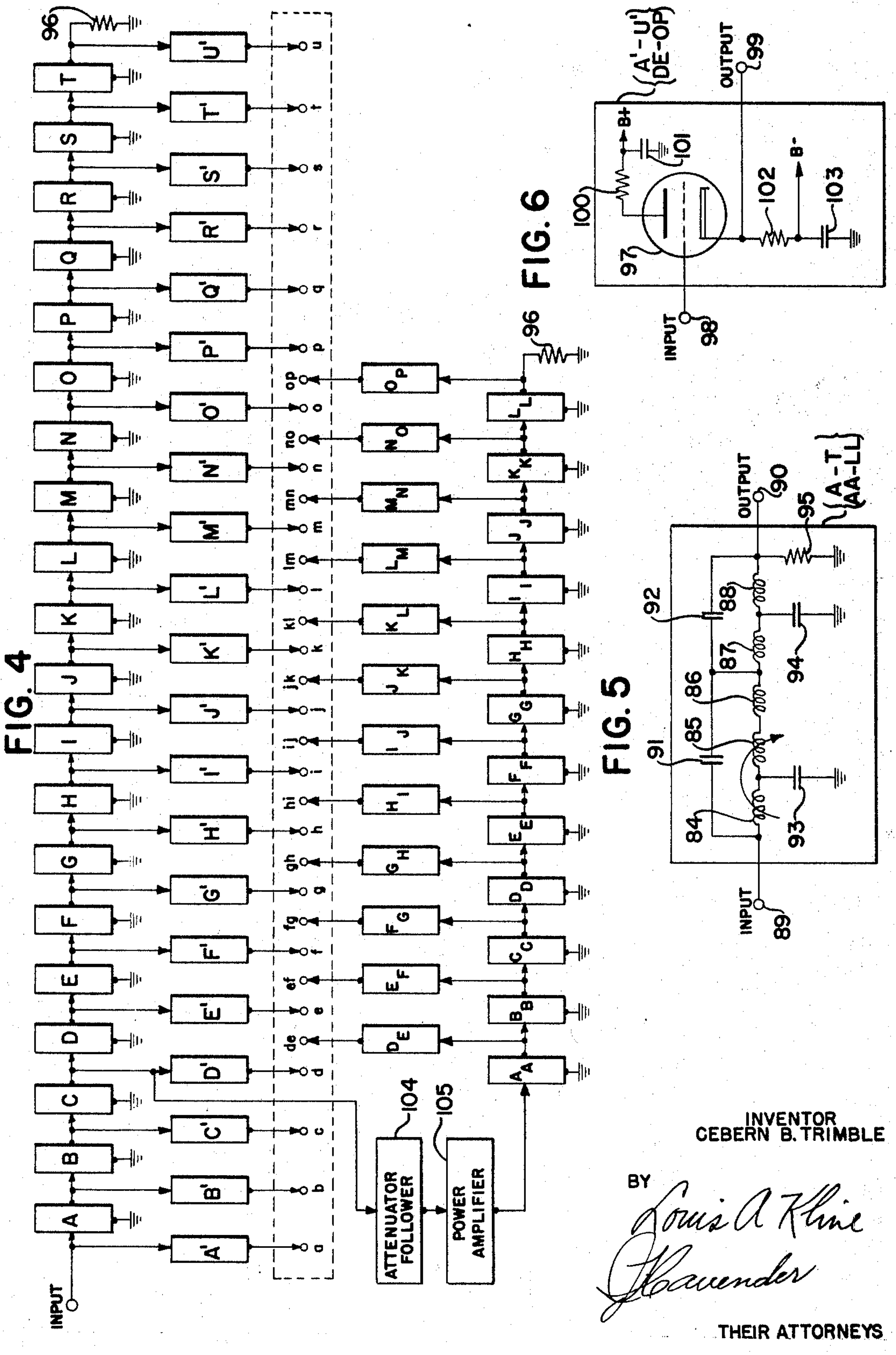
FIG. 4 is a diagrammatic representation of a delay line storage device utilized by the present invention.
FIG. 5 is a schematic representation of a single-section of the delay line diagrammatically shown in FIG. 4.
FIG. 6 is a schematic representation of a cathode follower amplifier diagrammatically shown in FIG. 4.

As previously described, the amplified signals are fed into a lumped constant delay line 29, having essentially zero attenuation and linear phase shift within the band width of the information used. At a tape speed of 150 inches per second and with characters printed at eight to the inch, character rate is 1200 characters per second or one character approximately every 833 microseconds. The delay line is preferably just longer than one character, and consequently has a total delay time of approximately 840 microseconds. With reference to FIGURE 4, delay line 29 is diagrammatically illustrated in greater detail and in the preferred embodiment comprises a plurality of similar serially connected delay sections A through T. Each of the delay sections A through T is essentially of identical circuit configuration, as schematically illustrated in FIGURE 5, and comprises a plurality of high Q toroidal core inductance coils 84, 85, 86, 87, and 88, serially connected between input terminal 89 and output terminal 90. Capacitors 91 and 92 are serially connected between terminals 89 and 90 and in parallel with inductances 84 through 88.

The junction of capacitors 91 and 92 is connected to the junction of inductances 86–87, whereas, the junctions of inductances 84–85 and 87–88 are respectively returned to a reference or ground potential through capacitors 93 and 94. Inductances 84 and 85 are preferably wound about the same core and consequently have essentially unity coupling therebetween. Each of delay sections A through S includes an equalizing impedance 95; however, delay section T is terminated by its characteristic impedance 96. Each of the delay sections has been found to possess the desired characteristics of essentially zero attenuation and linear phase shift within the 10 kilocycle band width and has a delay time substantially equal to 42 microseconds. There being twenty such serially connected delay sections, the total delay presented by delay sections A through T is the desired 840 microseconds.

The input and output of delay section A and the output of delay sections B through T are each connected to one of a plurality of similar cathode follower type amplifiers A' through U'. Each of cathode followers A' through U' is essentially of identical circuit configuration, as schematically illustrated in FIGURE 6, and comprises an electron discharge device 97 having an anode, a cathode and a control electrode. An input terminal 98 and an output terminal 99 are respectively connected to the control electrode and cathode of device 97. The anode of device 97 is connected through isolating resistor 100 to a source of positive unidirectional operating potential, commonly designated B+, which is bypassed to ground or a suitable reference potential through capacitor 101. The cathode of device 97 is connected through load resistor 102 to a source of negative unidirectional operating potential, commonly designated B—, which is bypassed to ground or a suitable reference potential through capacitor 103. Each of the output terminals of cathode followers A' through U' is respectively connected to terminals *a* through *u* which constitute the output terminals of delay line 29.

Therefore, it can be seen that delay sections A through T, along with associated cathode followers A' through U' constitute means for dispensing samples of the electrical signals contained in delay line 29 at a plurality of equally spaced time-base intervals of 42 microseconds each. Cathode followers A' through U' are utilized to prevent loading of the delay line and additionally to isolate the input from the output terminals thereof.

In order to provide convenient "half-tap" points for delay line 29 at major signal information points without additional attenuation loss, there is provided a second plurality of similar serially connected delay sections AA through LL. Delay sections AA through LL are essentially of identical circuit configuration as previously described delay sections A through T schematically shown in FIGURE 5. The output of delay section C is connected to the input of delay section AA through serially connected attenuator follower 104 and power amplifier 105. Attenuator 104 and amplifier 105 are entirely conventional of well-known construction and, therefore, a detailed description thereof is not deemed necessary. They have been provided merely to prevent additional loading of the delay sections of the delay line and for isolation purposes. In order to provide exact half-tap points for delay line 29, it is essential that each delay section BB through LL provide a 42 microsecond delay, and the combined delay of attenuator 104, amplifier 105 and section AA be only one-half or 21 microseconds.

The output terminals of delay sections AA through LL are each respectively connected to the input terminals of a second plurality of cathode followers DE through OP which are essentially of identical circuit configuration as A′ through U′ schematically illustrated in FIGURE 6. Each of the output terminals of cathode followers DE through OP is respectively connected to one of taps *de* through *op* which constitute the half-tap output terminals of delay line 29.

Therefore, it can be seen now that taps *a* through *d* provide samples of the electrical signal contained in delay line 29 at 42 microsecond intervals. Taps *de* through *op* provide samples of the signal at 21 microsecond intervals whereas, taps *q* through *u* provide samples at 42 microsecond intervals.

As previously described, a plurality of collating networks (30–31)*a* through (30–31)*k*, shown in FIGURE 3 as corresponding to numerals 0 through 9 and the illustrative symbol, are each connected to delay line 29 to have impressed thereon predetermined ones of the signal samples according to its related character. Accordingly, the numeral (1) network is connected to output taps *f, gh, ij, l, mn, op, p, q,* and *s* of delay line 29; numeral (2) network is connected to output taps *e, g, gh, ij, k, h, l, n,* and *o*; numeral (3) network is connected to output taps *a, b, c, d, e, f, gh, i, j, k, l, m, n, no, q,* and *t*; numeral (4) network is connected to output taps *a, b, c, d, e, f, g, i, k, l, lm, m, o, s,* and *t*; numeral (5) network is connected to output taps *a, b, c, d, de, e, g, kl, l, lm, m, o, r, s,* and *t*; numeral (6) network is connected to output taps *e, f, g, l, no, op,* and *q*; numeral (7) network is connected to output taps *ef, gh, hi, kl,* and *q*; numeral (8) is connected to output taps *d, de, gh, ij, no, q,* and *r*; numeral (9) is connected to output taps *e, gh, kl, lm, mn, no, p, q,* and *s*; numeral (0) network is connected to output taps *d, f, fg, i, ij, p,* and *r*; and the symbol network is connceted to output taps *c, d, f, g, h, i, k, l, m, n, o,* and *p*. The output from each collating network (30–31)*a* through (30–31)*k* is connected to the various inputs of storage matrix 32 through conductors 82*a* through 82*k* respectively as previously described.

Figure 8:
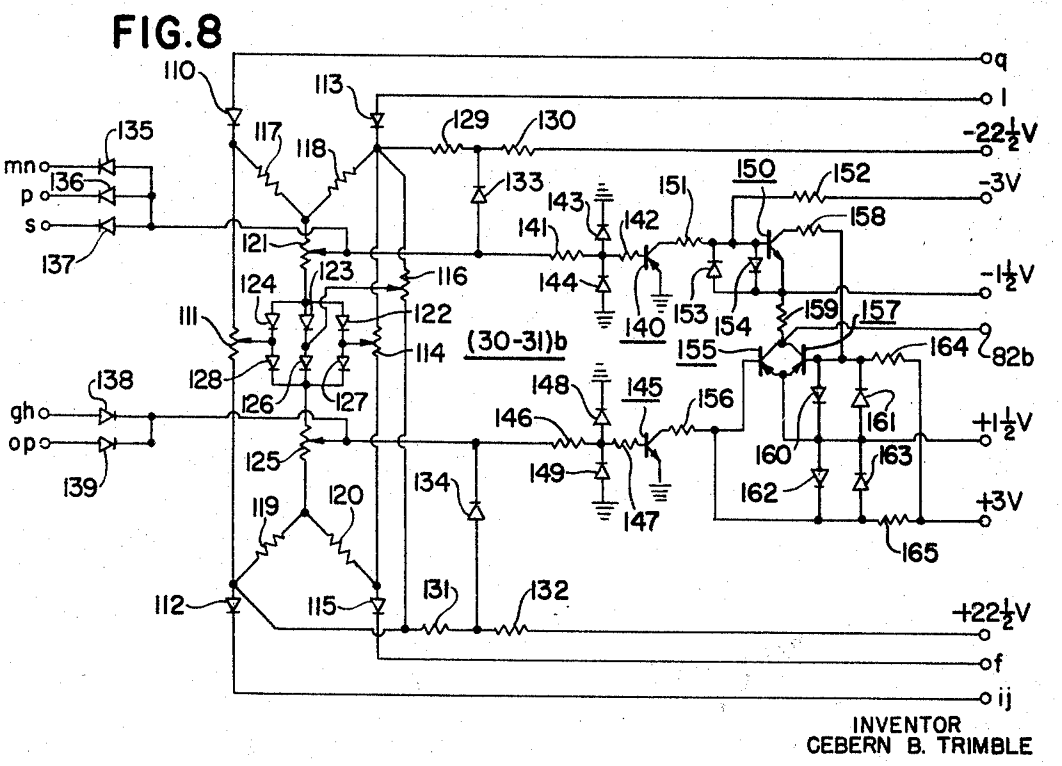

With reference to FIGURE 8 of the drawings, the numeral (1) collating network (30–31)*b* of the preferred embodiment is shown schematically in detail. The network comprises a crystal diode 110 whose anode is connected to tap *q* of delay line 29 and whose cathode is connected to one end of potentiometer 111. The opposite end of potentiometer 111 is connected to the anode of crystal diode 112 whose cathode is connected to tap *ij* of the delay line. The anode of crystal diode 113 is connected to tap *l* of the delay line and the cathode thereof is connected to one end of potentiometer 114. The opposite end of potentiometer 114 is connected to the anode of crystal diode 115 whose cathode is connected to tap *f* of the delay line. The cathode of diode 113 is connected to the anode of diode 112 through potentiometer 116 connected therebetween. The cathodes of diodes 110 and 113 are connected together through series-connected resistors 117 and 118, whereas the anodes of diodes 112 and 115 are connected together through series-connected resistors 119 and 120.

One end of potentiometer 121 is connected to the junction of resistors 117 and 118, and the opposite end thereof is connected to the anode of crystal diode 122 whose cathode is connected to the movable tap of potentiometer 114. The opposite end of potentiometer 121 is also connected to the anode of crystal diode 123 whose cathode is connected to the movable arm of potentiometer 116. The opposite end of potentiometer 121 is still further connected to the anode of crystal diode 124 whose cathode is connected to the movable arm of potentiometer 111. One end of potentiometer 125 is connected to the junction of resistors 119 and 120 and the opposite end thereof is connected to the cathode of crystal diode 126 whose anode is also connected to the movable arm of potentiometer 116. The opposite end of potentiometer 125 is also connected to the cathode of crystal diode 127 whose anode is also connected to the movable arm of potentiometer 114. The opposite end of potentiometer 125 is still further connected to the cathode of crystal diode 128 whose anode is also connected to the movable arm of potentiometer 111.

The cathode of diode 113 is connected to a source of negative unidirectional reference potential through series-connected resistors 129 and 130, whereas the anode of diode 112 is connected to a source of positive unidirectional reference potential through series-connected resistors 131 and 132. The cathode of crystal diode 133 is connected to the junction of resistors 129 and 130 and the anode thereof is connected to the movable arm of potentiometer 121. The anode of crystal diode 134 is connected to the junction of resistors 131 and 132 and the cathode thereof is connected to the movable arm of potentiometer 125. The cathodes of inhibiting crystal diodes 135, 136 and 137 are respectively connected to output taps *mn, p* and *s* of the delay line and the anodes thereof are each connected to the movable arm of potentiometer 121. The anodes of inhibiting crystal diodes 138 and 139 are respectively connected to output taps *gh* and *op* of the delay line and the cathodes thereof are each connected to the movable arm of potentiometer 125.

The movable arm of potentiometer 121 is coupled to the base of grounded-emitter transistor 140 through serially-connected resistors 141 and 142. The anode of crystal diode 143 and the cathode of crystal diode 144 are each connected to the junction of resistors 141 and 142 and the remaining cathode and anode respectively thereof are each returned to a reference or ground potential. The movable arm of potentiometer 125 is coupled to the base of grounded-emitter transistor 145 through serially-connected resistors 146 and 147. The anode of crystal diode 148 and the cathode of crystal diode 149 are each connected to the junction of resistors 146 and 147 and the remaining cathode and anode respectively thereof are each returned to a reference or ground potential.

The collector of transistor 140 is coupled to the base of transistor 150 through resistor 151 connected therebetween. The base of transistor 150 is returned to a first source of negative unidirectional operating potential through series-dropping resistor 152 and is also returned to a second source of negative unidirectional operating potential through the parallel combination of oppositely connected crystal diodes 153 and 154. The collector of transistor 145 is coupled to the base of transistor 155 through dropping resistor 156 and the collector of transistor 150 is coupled to the base of transistor 157 through dropping resistor 158. The collectors of transistors 155 and 157 are connected together and coupled to the emitter of transistor 150 through dropping resistor 159. The emitters of transistors 155 and 157 are connected together, returned to a source of positive unidirectional operating potential, coupled to the base of transistor 157 through the parallel combination of oppositely connected crystal diodes 160 and 161, and coupled to the base of transistor 155 through the parallel combination of oppositely connected crystal diodes 162 and 163. The base of transistor 157 is returned to a source of positive unidirectional operating potential through dropping resistor 164 and the base of transistor 155 is also returned to a source of positive unidirectional operating potential through series dropping resistor 165. And finally the output connection 82*b* is connected to the junction of the emitters of transistors 155 and 157.

Figures 7A, 7B, 7C, 7D:
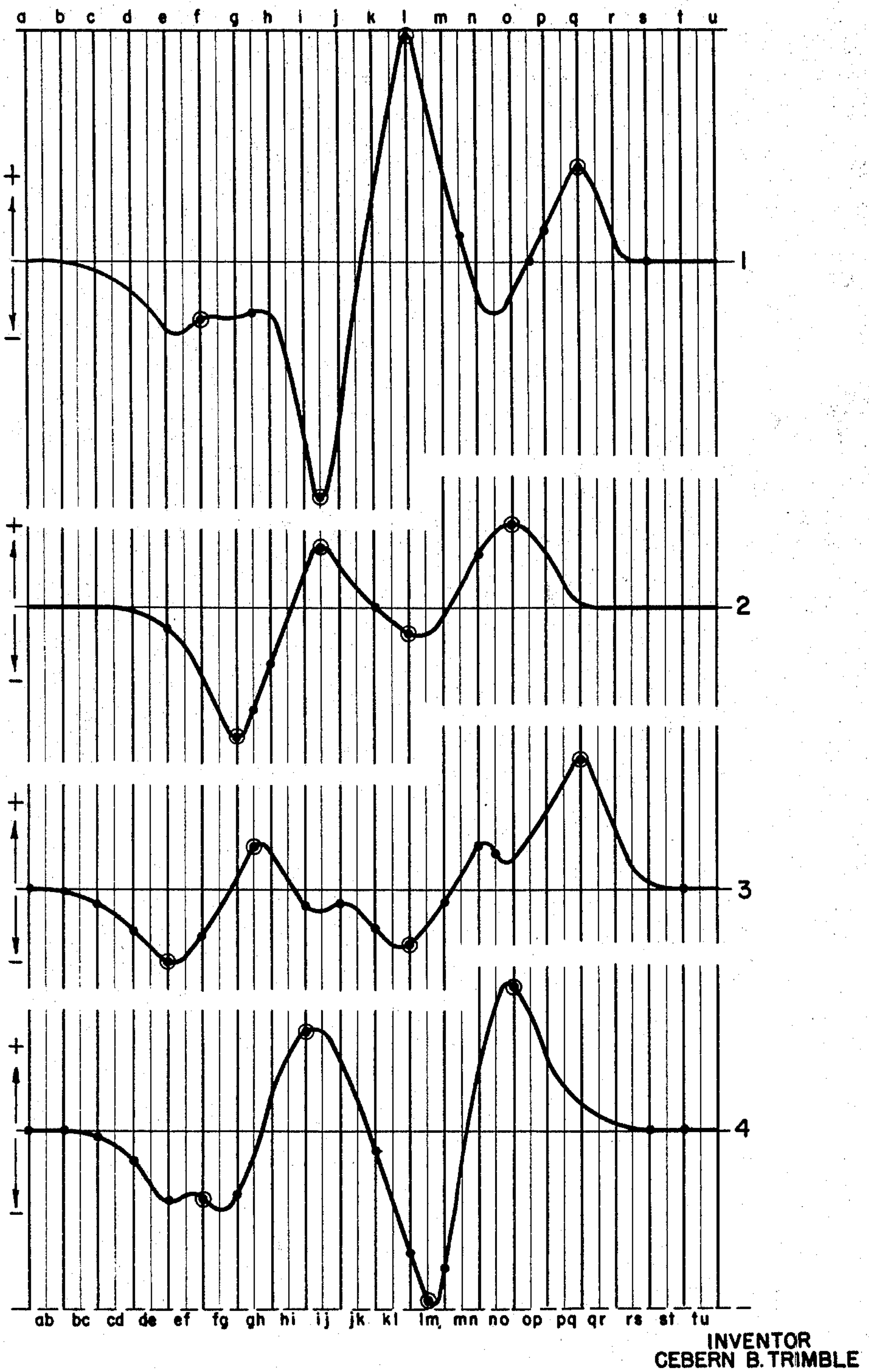

In operation, if it is assumed that the numeral (1) character has just passed over the read head and an electrical signal is generated therefrom having a characteristic wave-shape corresponding to the numeral just read and is centered in the delay line, the instantaneous potentials appearing at output taps *a* through *u* correspond to the representative curve shown in FIGURE 7*a*. When the potentials appearing at taps *q* and *ij* are positive and negative respectively, diodes 110 and 112 conduct and two potentials appear across potentiometer 111. The movable arm of potentiometer 111 has previously been adjusted so that the potential thereon is zero when the potentials at taps *q* and *ij* are of a proper ratio corresponding to the numeral (1), as has fully been described in connection with the simplified zero character collating network shown in FIGURE 1. If, as a result of the comparison of the potentials on taps *q* and *ij*, the potential on the movable arm of potentiometer 111 is negative, diode 124 conducts and the negative potential is applied to the movable arm of potentiometer 121 through the resistive lower half thereof. However, if the potential on the movable arm of potentiometer 111 is positive, diode 128 conducts and the positive potential is applied to the movable arm of potentiometer 125 through the resistive upper half thereof.

When the potentials appearing at taps *l* and *ij* are positive and negative respectively, diodes 113 and 112 conduct and the two potentials appear across potentiometer 116. The movable arm of potentiometer 116 has previously been adjusted so that the potential thereon is zero when the potentials at taps *l* and *ij* are of a proper ratio corresponding to the numeral (1). If the potential on the movable arm of potentiometer 116 is other than zero, i.e. either negative or positive, the corresponding diode 123 or 126 conducts and applies a corresponding negative or positive potential to the movable arm of potentiometer 121 or 125. Likewise, potentiometer 114 compares the potential at tap *l* with the potential at tap *f*. If the ratio of these two potentials does not correspond to the numeral (1), a corresponding negative or positive potential is applied to one of the movable arms of potentiometers 121 and 125.

Resistors 117 and 118 compare the two positive potentials at taps *q* and *l* and produce at their junction a positive potential equal to the average of the potentials at the two taps. Also, resistors 119 and 120 compare the two negative potentials at taps *f* and *ij* and produce at their junction a negative potential equal to the average of the two potentials. Potentiometers 121 and 125 compare the average positive potential with the average negative potential at the junctions of resistors 117–118 and 119–120 and if the ratio of these two potentials does not correspond to the numeral (1), either a negative potential is applied to the movable arm of potentiometer 121 or a positive potential is applied to the movable arm of potentiometer 125.

It should be noted at this point, however, that when the potential on the movable arms of either of potentiometers 111, 114, or 116 is negative by only an infinitesimal amount, the potential of the movable arm of potentiometer 121 remains essentially at zero due to the potential drop across the lower portion of potentiometer 121. Also, when the potential on the movable arms of either of potentiometers 111, 114, or 116 is positive by only an infinitesimal amount, the potential on the movable arm of potentiometer 125 remains essentially at zero due to the potential drop across the upper portion of potentiometer 125. Therefore, the combined resistance of the lower portion of potentiometer 121 and the upper portion of potentiometer 125 permits the ratio of the comparison of the potentials at taps *q, l, f,* and *ij* to vary a predetermined amount from null before either of the movable arms of potentiometers 121 or 125 becomes respectively negative or positive. The resistances between the movable arms of potentiometers 121 and 125 can be considered as a "tolerance" resistance which is adjustable and whose value determines the amount by which the electrical signal in delay line 29 is permitted to deviate due to poor printing, speed changes, etc., and still allow the character to be identified.

Resistors 129 and 130 compare the positive potential at tap *l* with a reference potential of −22½ volts. As long as the potential at tap *l* is equal to or greater than 22½ volts, diode 133 remains nonconductive. However, should the potential at tap *l* be less than the reference potential, i.e. during the absence of a signal in delay line 29, diode 133 conducts and a negative potential is applied to the movable tap of potentiometer 121. Resistors 131 and 132 compare the potential at tap *ij* with a reference potential of +22½ volts. As long as the potential at tap *ij* is equal to or greater than the reference potential, diode 134 remains nonconductive. However, when the potential at tap *ij* is less than the reference potential, a positive potential is applied to the movable tap of potentiometer 125.

Inhibiting diodes 138 and 139 continually analyze the potentials at taps *gh* and *op* respectively. As long as these potentials are either zero or negative, both diodes remain nonconductive. If either of the potentials is positive, the respective diode conducts to apply a positive potential to the movable arm of potentiometer 125. A second set of inhibiting diodes 135, 136, and 137 continually analyze the potentials at taps *mn, p*, and *s*. As long as these potentials are either zero or positive, all diodes remain nonconductive. If any of the potentials are negative, the respective diode conducts to apply a negative potential to the movable tap of potentiometer 121.

Neglecting for a moment clamping diodes 143, 144, 148, 149, 153, 154, 160, 161, 162, and 163, as long as the potential on the movable arm of potentiometer 125 is either zero or negative, indicating recognition of the character, transistor 145, being of an NPN variety, is nonconductive, and thus the current from collector to emitter thereof is zero. The collector current of transistor 145 being zero, a positive potential of +3 volts is applied to the base of transistor 155 which is of the PNP variety. As a positive potential of +1½ volts is applied to the emitter of transistor 155, the base thereof is positive with respect to the emitter and consequently transistor 155 is cut off and thus rendered nonconductive.

As long as the potential on the movable arm of potentiometer 121 is either zero or positive, also indicating recognition of the character, transistor 140, being of a PNP variety, is nonconductive and thus the current from emitter to collector thereof is zero. The collector current of transistor 140 being zero, a negative potential of −3 volts is applied to the base of transistor 150 which is of an NPN variety. As a negative potential of −1½ volts is applied to the emitter of transistor 150, the base is negative with respect to the emitter and consequently transistor 150 is cut off and thus rendered nonconductive. The collector current of transistor 150 being zero, a positive potential of +3 volts is applied to the base of transistor 157 which is of a PNP variety. As a positive potential of +1½ volts is applied to the emitter of transistor 157, the base thereof is positive with respect to the emitter and consequently, transistor 157 is cut off and thus rendered nonconductive. With no collector current flowing in either of transistors 155 or 157, output terminal 82*b* is at a negative potential of −1½ volts which constitutes a character-identification signal.

Thus, it is seen that whenever a signal appears in delay line 29 corresponding to the numeral (1) within the limits as determined by tolerance potentiometers 121 and 125, all of the transistors of collating network (30–31)*b* are cut-off and a negative output signal appears at 82*b*, thus indicating that the character has been recognized as a numeral (1). However, should the signal in delay line 29 correspond to a character other than the numeral (1), either or both of the movable arms of potentiometers 121 and 125 are respectively at a negative or positive potential.

Whenever the movable tap of potentiometer 125 is positive, transistor 145 is rendered conductive and the positive potential on the base of transistor 155 decreases until its base is negative with respect to its emitter. When the base of transistor 155 is negative with respect to its emitter, the transistor is rendered conductive and the output at 82*b* approaches a positive potential of +1½ volts thus indicating non-recognition of the character. Likewise, whenever the movable tap of potentiometer 121 is negative, transistor 140 is rendered conductive and the negative potential on the base of transistor 150 is decreased until its base is positive with respect to its emitter. When the base of transistor 150 is positive with respect to its emitter, the transistor is rendered conductive and decreases the positive potential on the base of transistor 157 until its base is negative with respect to its emitter. When the base of transistor 157 is negative with respect to its emitter, the transistor is rendered conductive and the output at 82*b* again approaches a positive potential of +1½ volts, thus again indicating non-recognition of the character.

There is therefore non-recognition under three sets of circumstances: when the movable arm of potentiometer 121 is at a negative potential, transistors 140, 150, and 157 voltage to the base thereof to plus or minus ¼ volt, and thus limits the maximum base current and excessive minority carriers in each transistor and yet provides a switching signal of sufficient magnitude for instantaneously switching each transistor from the states of nonconduction to conduction to nonconduction. In addition, it is preferred that all transistors have a high frequency alpha cut-off characteristic to further improve switching speeds.

Each of the remaining collating networks for numerals (2) through (0), as schematically shown in FIGURES 9 through 17 respectively, are essentially of identical circuit configuration as the just described numeral (1) collating network and consequently a detailed description of each of the remaining numeral collating network would be surplusage and thus not deemed necessary for a complete understanding of the present invention. The primary differences in each of the remaining collating networks reside in the absolute values of each of the circuit components, the number and placement of the inhibiting diodes, and the investigation of the potentials at different taps of the delay line.

With reference to the following chart, and with no intention to be limited thereby, there is shown, for illustrative purposes only, one set of values of the various circuit components for each of the numeral collating networks. It is to be understood of course that various other values of circuit components would also give the desired resistive ratios and thus may be utilized with equal success and consequently fall within the purview of the present invention.

| Resistor Number | Numeral Collating Networks | | | | | | | | | |
|---|---|---|---|---|---|---|---|---|---|---|
| | (1) | (2) | (3) | (4) | (5) | (6) | (7) | (8) | (9) | (0) |
| 111 | 100K | 100K | 100K | 100K | 100K | 100K | 100K | 100K | 100K | 100K |
| 114 | 100K | 100K | 100K | 100K | 100K | 100K | 100K | 100K | 100K | 100K |
| 116 | 100K | 100K | 100K | 100K | 100K | 100K | 100K | 100K | 100K | 100K |
| 117 | 620K | 430K | 560K | 620K | 750K | 470K | 510K | 470K | 620K | 820K |
| 118 | 620K | 430K | 560K | 620K | 750K | 470K | 510K | 470K | 620K | 820K |
| 119 | 510K | 510K | 330K | 620K | 510K | 470K | 560K | 560K | 560K | 470K |
| 120 | 510K | 510K | 330K | 620K | 510K | 470K | 560K | 560K | 560K | 470K |
| 121 | 50K | 50K | 50K | 50K | 50K | 50K | 50K | 50K | 50K | 50K |
| 125 | 50K | 50K | 50K | 50K | 50K | 50K | 50K | 50K | 50K | 50K |
| 129 | 470K | 470K | 470K | 470K | 470K | 470K | 470K | 470K | 470K | 470K |
| 130 | 470K | 470K | 470K | 470K | 470K | 470K | 470K | 470K | 470K | 470K |
| 131 | 470K | 470K | 470K | 470K | 470K | 470K | 470K | 470K | 470K | 470K |
| 132 | 470K | 470K | 470K | 470K | 470K | 470K | 470K | 470K | 470K | 470K |
| 141 | 100K | 100K | 100K | 100K | 100K | 100K | 100K | 100K | 100K | 100K |
| 142 | 4.7K | 4.7K | 4.7K | 4.7K | 4.7K | 4.7K | 4.7K | 4.7K | 4.7K | 4.7K |
| 146 | 100K | 100K | 100K | 100K | 100K | 100K | 100K | 100K | 100K | 100K |
| 147 | 4.7K | 4.7K | 4.7K | 4.7K | 4.7K | 4.7K | 4.7K | 4.7K | 4.7K | 4.7K |
| 151 | 11K | 11K | 11K | 11K | 11K | 11K | 11K | 11K | 11K | 11K |
| 152 | 68K | 68K | 68K | 68K | 68K | 68K | 68K | 68K | 68K | 68K |
| 156 | 11K | 11K | 11K | 11K | 11K | 11K | 11K | 11K | 11K | 11K |
| 158 | 11K | 11K | 11K | 11K | 11K | 11K | 11K | 11K | 11K | 11K |
| 159 | 11K | 11K | 11K | 11K | 11K | 11K | 11K | 11K | 11K | 11K |
| 164 | 68K | 68K | 68K | 68K | 68K | 68K | 68K | 68K | 68K | 68K |
| 165 | 68K | 68K | 68K | 68K | 68K | 68K | 68K | 68K | 68K | 68K |

NOTES:

1. Resistor 166 used in numeral (eight) network only=100K.
2. Diodes 143–144, 148–149, 153–154, 160–161, and 162–163 are 1N128, all remaining diodes 1N468.
3. Transistors 140, 155, and 157 (2N113).
4. Transistors 145, and 150 (2N385).

are conductive; when the movable arm of potentiometer 125 is at a positive potential, transistors 145 and 155 are conductive; and when the potentials on the movable arms of potentiometers 121 and 125 are both negative and positive respectively, all of the transistors of collating network (30–31*b*) are conductive to inhibit the character-identification signal at 82*b*.

In order to prevent strong positive or negative signal overload of the transistors, resulting in momentary or complete paralysis thereof, and to insure high speed switching action of the collating network, reversely connected clamping diodes 143–144, 148–149, 153–154, 162–163, and 160–161 are respectively connected from the base to the emitter of transistors 140, 145, 150, 155, and 157. The clamping diodes have the effect of limiting the maximum positive and negative potential excursions on the base of each transistor with respect to its emitter to the potential drop across the conductive diode which is approximately plus or minus ¼ volt. Clamping the base to the emitter of each transistor in effect limits the input The numeral (2) network of FIGURE 9 identifies a signal having a characteristic wave shape as shown in FIGURE 7*b*. The potentials at taps *ij*, *o*, *l*, and *g* are compared with respect to one another and with respect to a reference potential the same as in the numeral (1) network. Inhibiting diodes 167 through 171 constantly examine the potentials at taps *n*, *e*, *gh*, *h*, and *k* respectively, also, as in the numeral (1) network.

Figure 10:
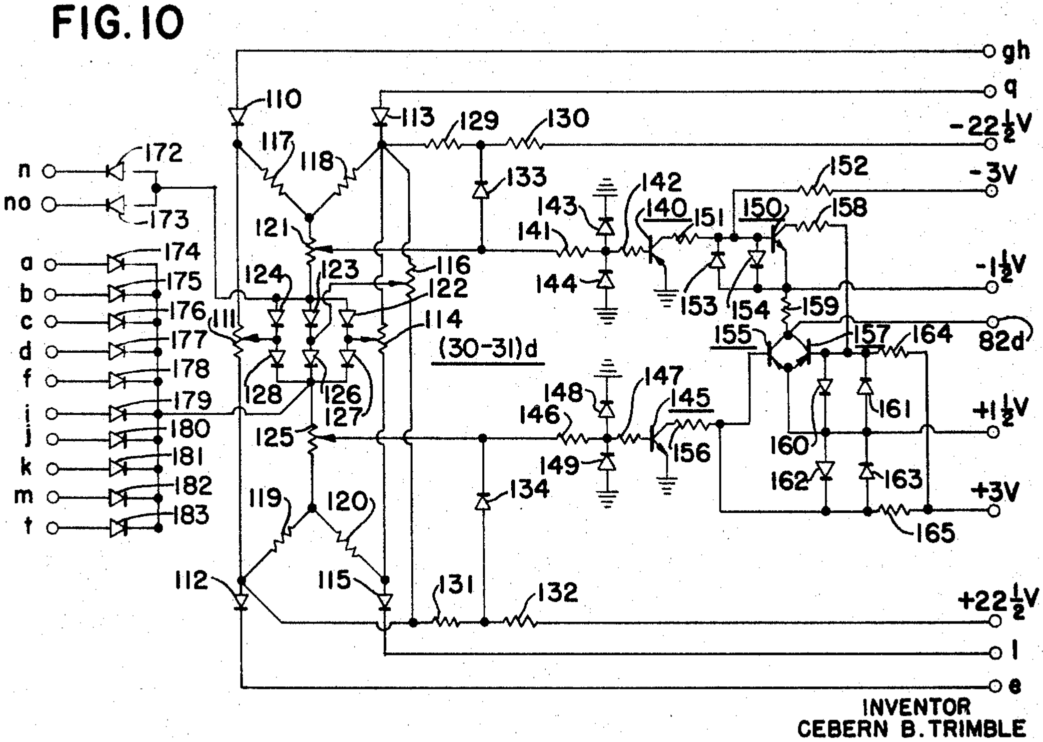

The numeral (3) network of FIGURE 10 identifies a signal having a characteristic wave shape as shown in FIGURE 7*c*. The potentials at taps *gh*, *q*, *l*, and *e* are compared with respect to one another and with respect to a reference potential and inhibiting diodes 172 through 183 constantly examine the potentials at taps *n*, *no*, *a*, *b*, *c*, *d*, *f*, *i*, *j*, *k*, *m*, and *t* respectively.

Figure 11:
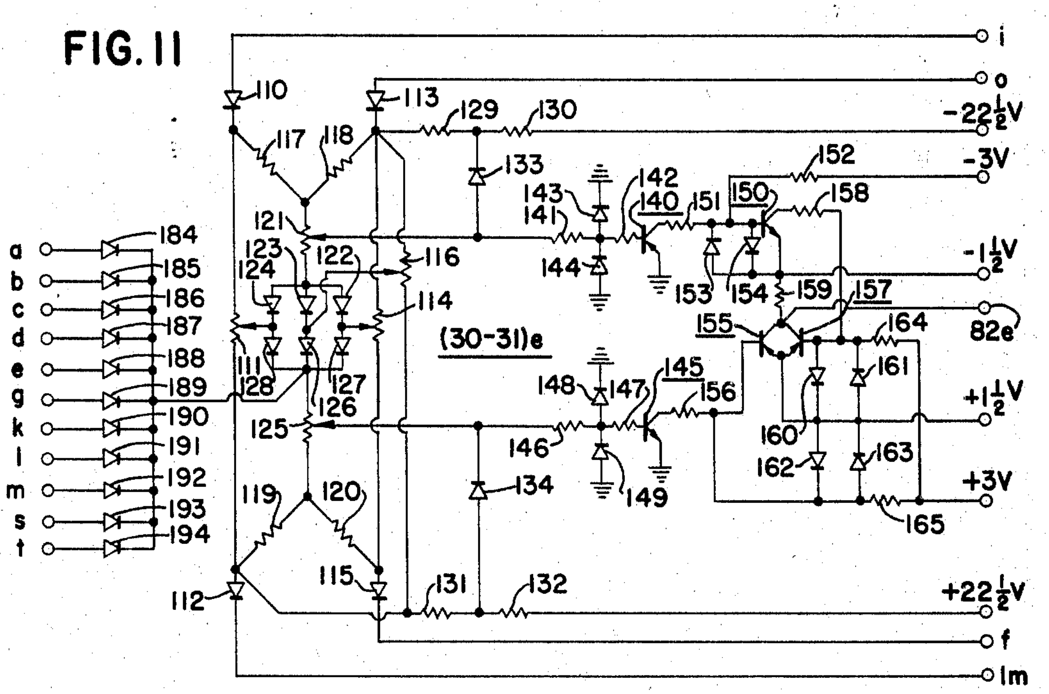

The numeral (4) network of FIGURE 11 identifies a signal having a characteristic wave shape as shown in FIGURE 7*d*. The potentials at taps *i*, *o*, *f*, and *lm* are compared with respect to one another and with respect to a reference potential and inhibiting diodes 184 through 194 constantly examine the potentials at taps *a, b, c, d, e, g, k, l, m, s,* and *t* respectively.

Figures 7E, 7F, 7G, 7H:
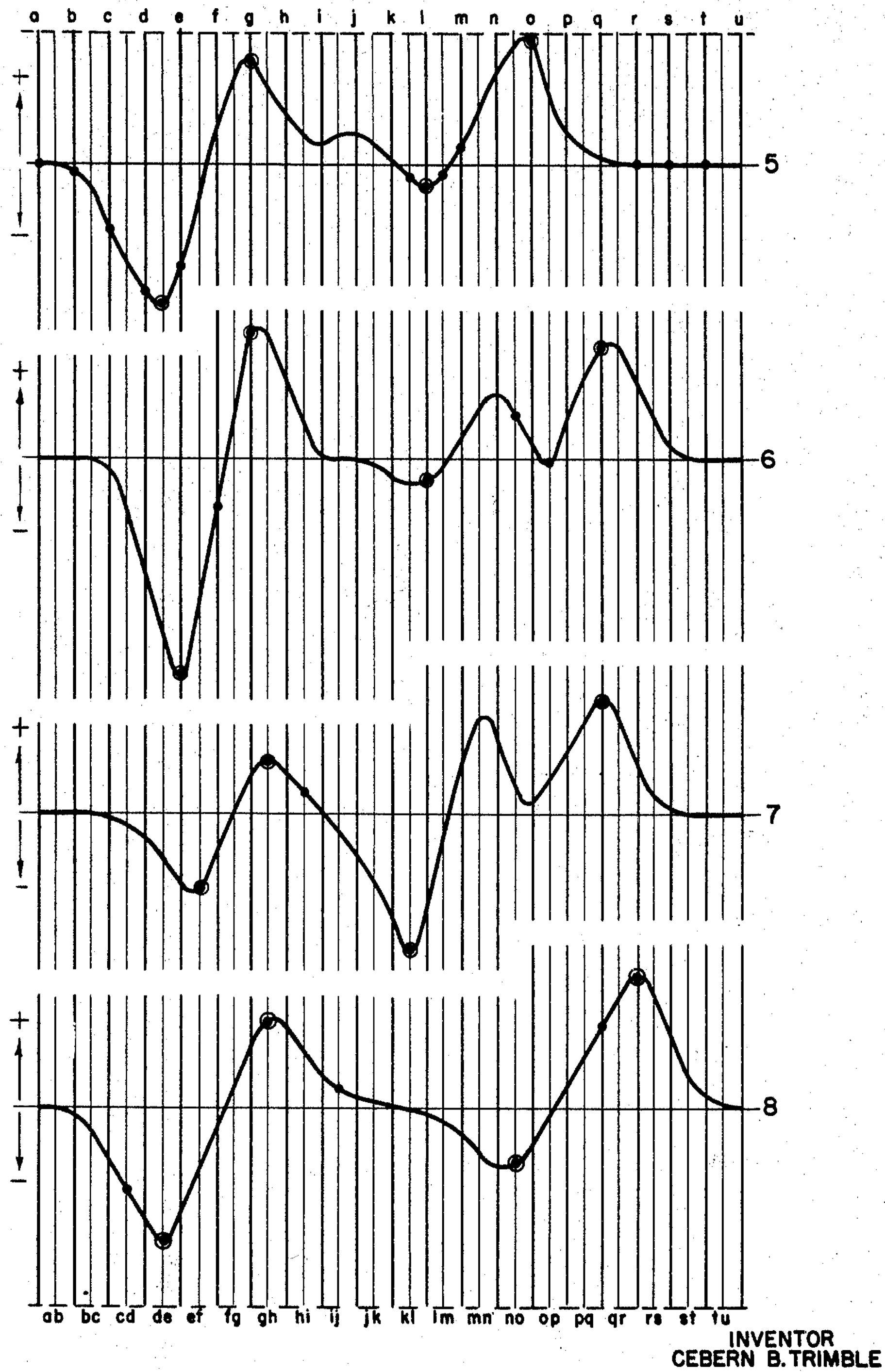
Figure 12:
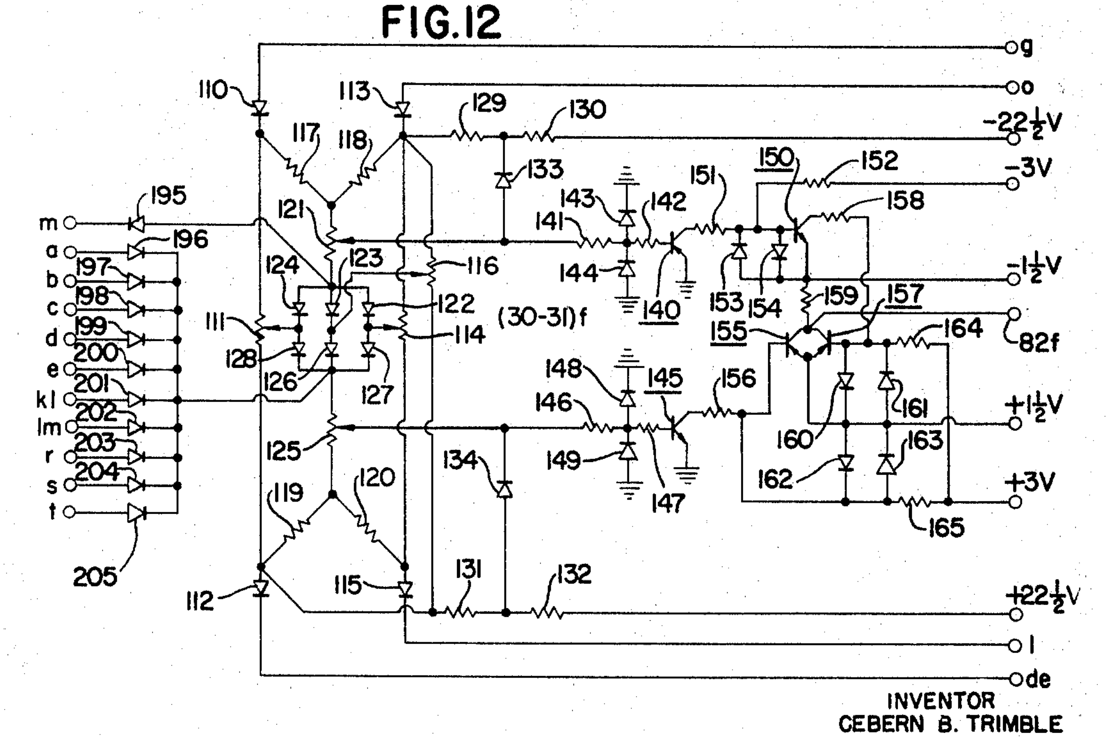

The numeral (5) network of FIGURE 12 identifies a signal having a characteristic wave shape as shown in FIGURE 7*e*. The potentials at taps *g, o, l,* and *de* are compared with respect to one another and with respect to a reference potential and inhibiting diodes 195 through 205 constantly examine the potentials at taps *m, a, b, c, d, e, kl, lm, r, s* and *t* respectively.

Figure 13:
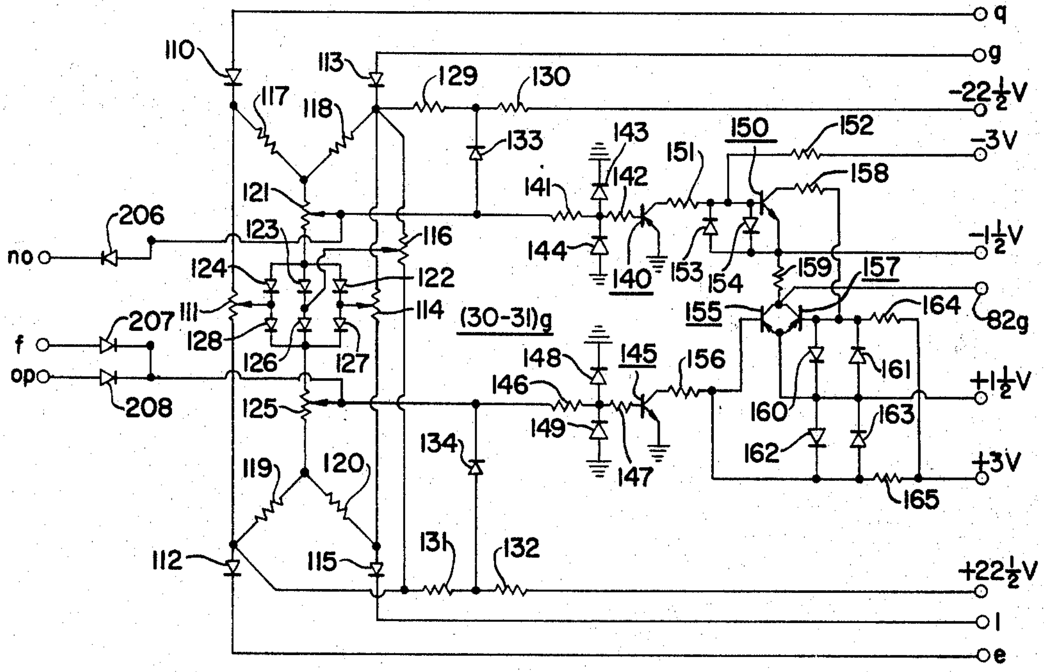

The numeral (6) network of FIGURE 13 identifies a signal having a characteristic wave shape as shown in FIGURE 7*f*. The potentials at taps *q, g, l,* and *e* are compared with respect to one another and with respect to a reference potential and inhibiting diodes 206 through 208 constantly examine the potentials at taps *no, f* and *op* respectively.

Figure 14:
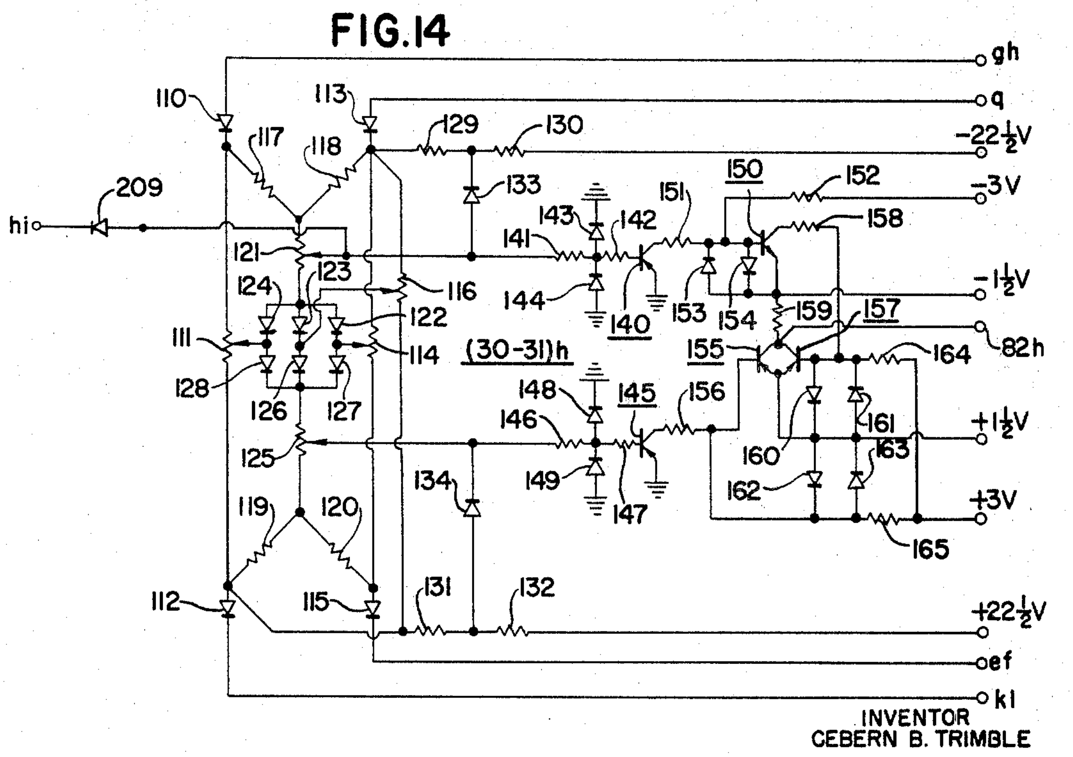

The numeral (7) network of FIGURE 14 identifies a signal having a characteristic wave shape as shown in FIGURE 7*g*. The potentials at taps *gh, q, ef,* and *kl* are examined with respect to one another and with respect to a reference potential and inhibiting diode 209 constantly examines the potential at tap *hi*.

Figure 15:
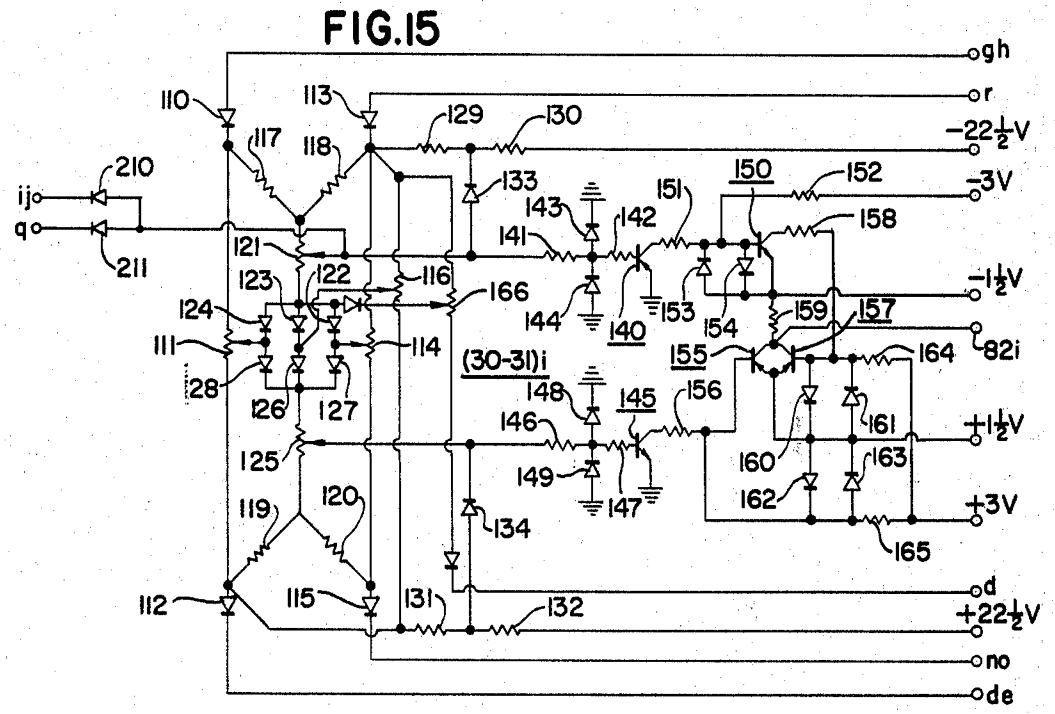

The numeral (8) network of FIGURE 15 identifies a signal having a characteristic wave shape as shown in FIGURE 7*h*. The potentials at taps *gh, r, d, no,* and *de* are examined with respect to one another and with respect to a reference potential and inhibiting diodes 210 and 211 constantly examine the potentials at taps *ij* and *q* respectively.

Figures 7I, 7J, 7K:
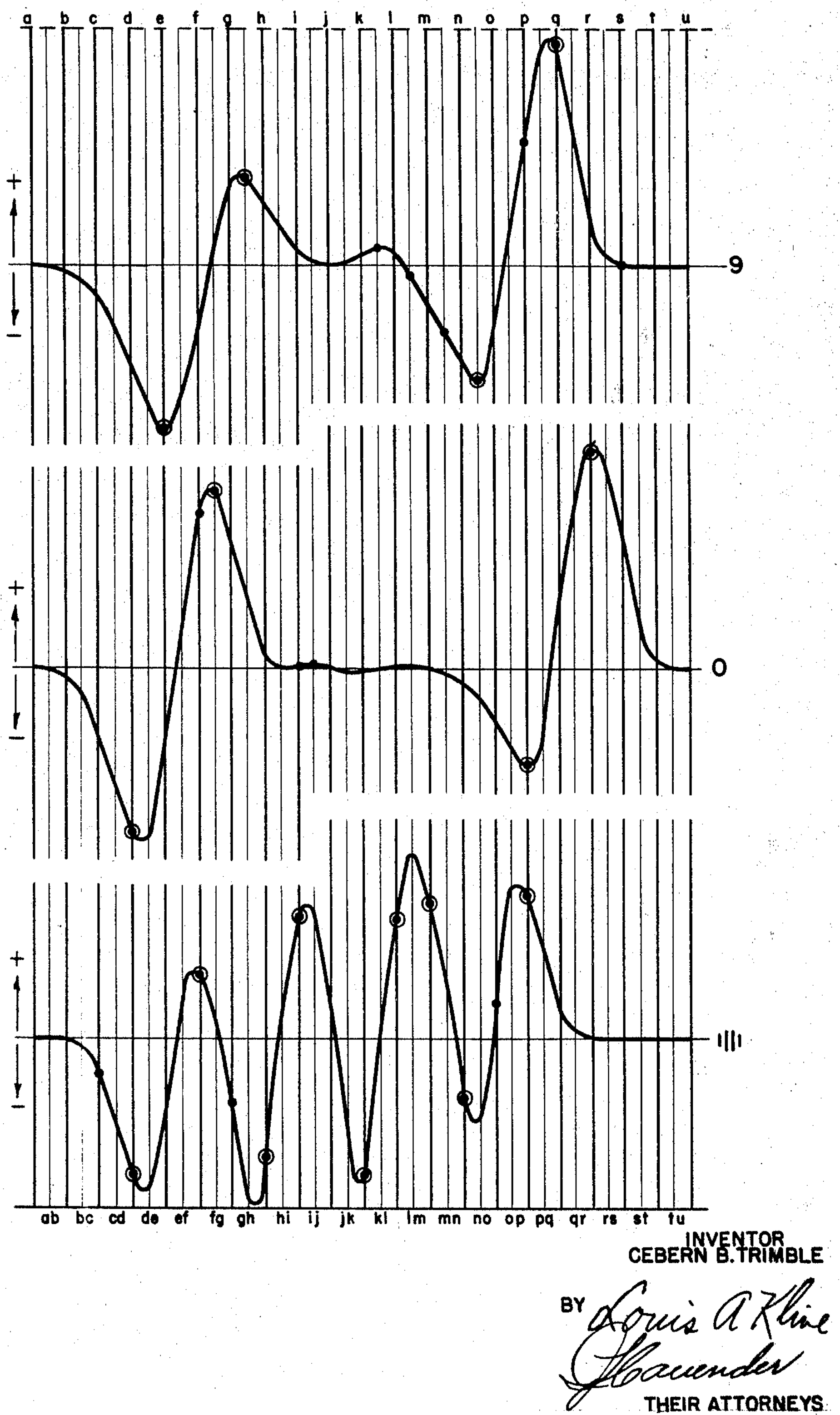
Figure 9:
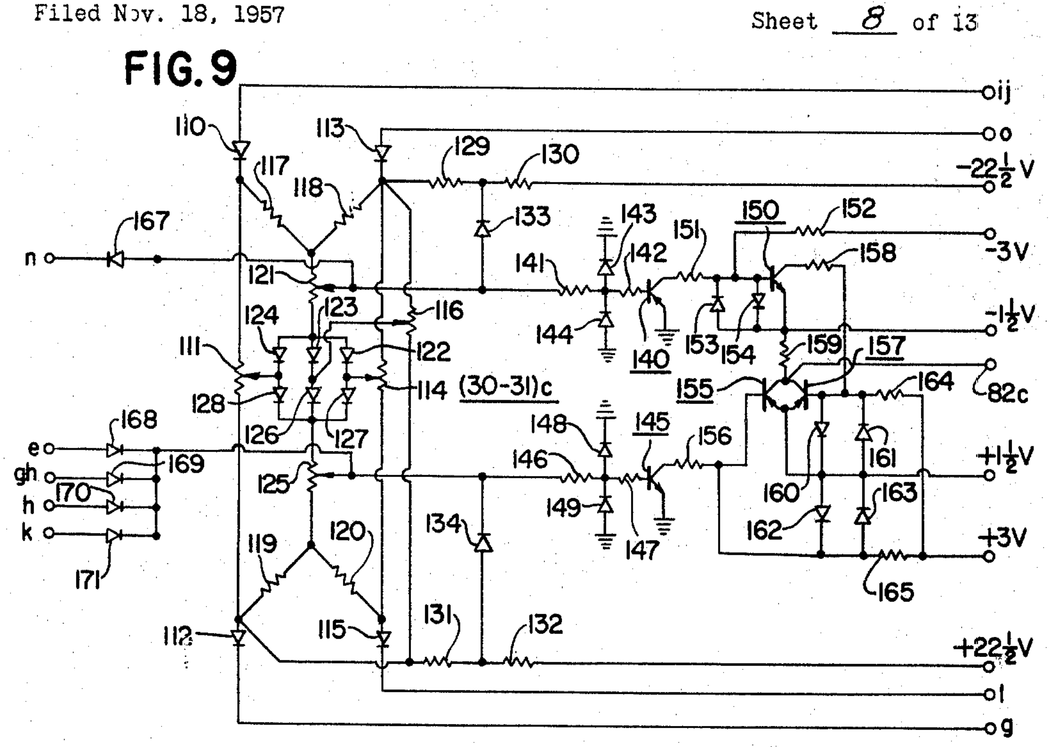
Figure 16:
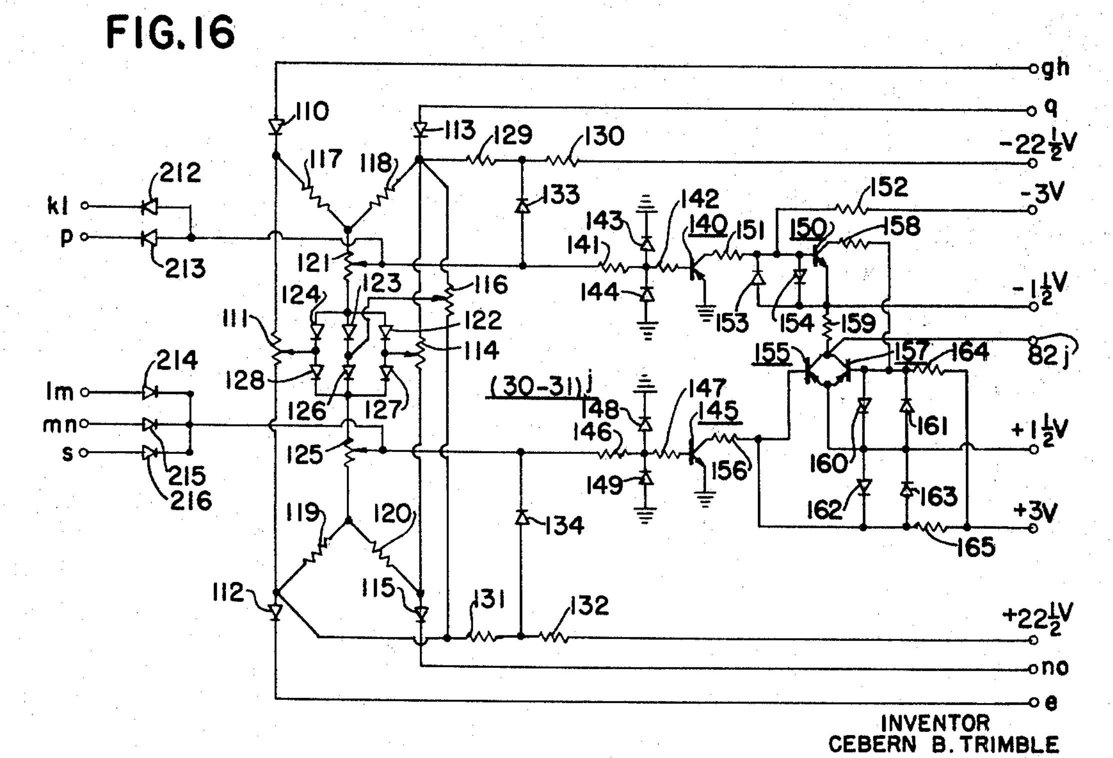

The numeral (9) network of FIGURE 16 identifies a signal having a characteristic wave shape as shown in FIGURE 7*i*. The potentials at taps *gh, q, no* and *e* are examined with respect to one another and with respect to a reference potential and inhibiting diodes 212 through 216 constantly examine the potentials at taps *kl, p, lm, mn,* and *s* respectively.

Figure 17:
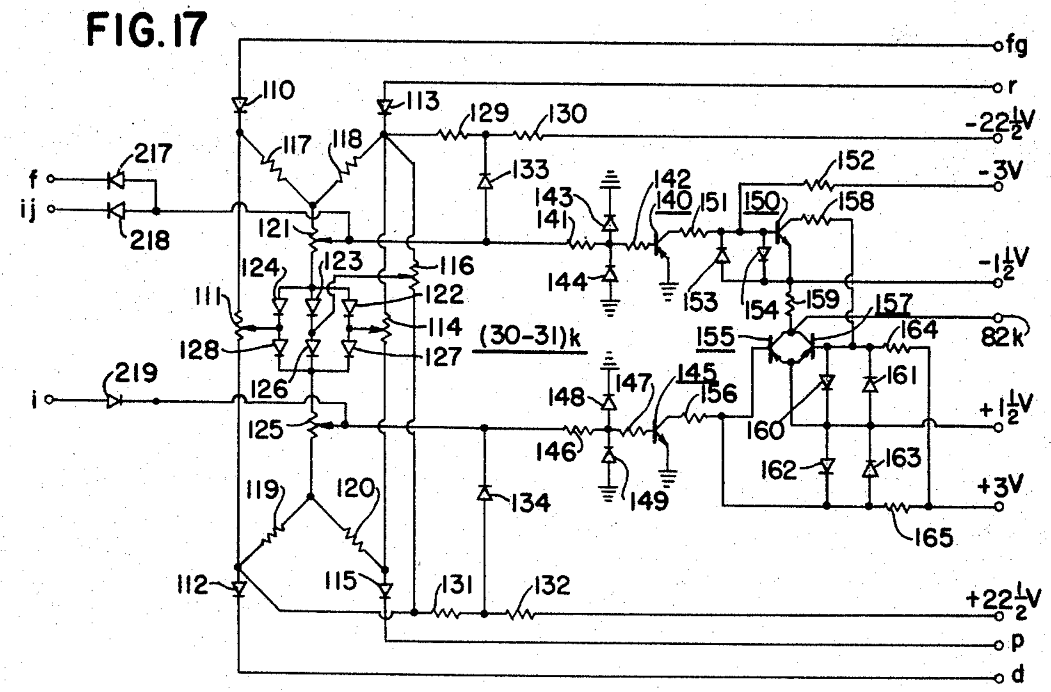

The numeral (0) network of FIGURE 17 identifies a signal having a characteristic wave shape as shown in FIGURE 7*j*. The potentials at taps *fg, r, p,* and *d* are examined with respect to one another and with respect to a reference potential and inhibiting diodes 217 through 219 constantly examine the potentials at taps *f, ij,* and *i* respectively.

Figure 18:
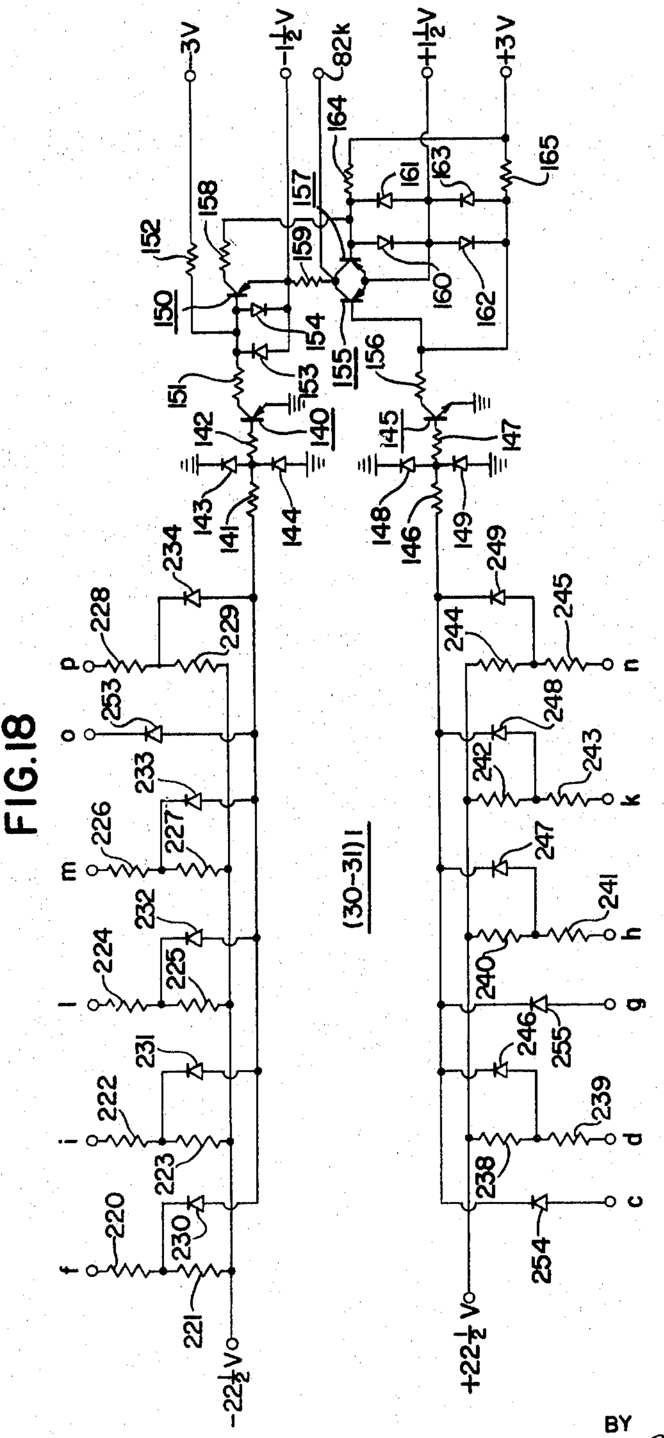

The illustrative symbol network of FIGURE 18 identifies a signal having a characteristic wave shape as shown in FIGURE 7*k*. Due to the high degree of stylization of the symbol and consequently, the great amount of information contained in the wave-shape of the signal generated therefrom, the network is much less complex than those just described for numerals (1) through (0). In this instance resistor combinations 220–221, 222–223, 224–225, 226–227, and 228–229 compare the potentials on taps *f, i, l, m,* and *p*, respectively, with a negative unidirectional reference potential of −22½ volts. If the junctions of any of these resistor combinations is at a negative potential, one or more of the corresponding diodes 230 through 234 conducts and applies a negative potential on the base of transistor 140 through resistors 141 and 142. The negative potential on the base of transistor 140 causes transistors 140, 150, and 157 to conduct. If the potentials at the junctions of the resistor combinations are all zero or positive, transistors 140, 150, and 157 remain nonconductive. Resistor combinations 238–239, 240–241, 242–243, and 244–245 compare the potentials at taps *d, h, k* and *n* respectively, with a positive unidirectional potential of +22½ volts. As long as the junctions of these resistor combinations are at a zero or negative potential, the corresponding diodes 246 through 249 remain nonconductive. However, if any of these junctions are positive, a positive potential is applied to the base of transistor 145 through resistors 146 and and 147 to render transistors 145 and 155 conductive. Therefore, whenever the potentials at taps *f, i, l, m, p, d, h, k,* and *n* are greater than and of opposite polarity than their respective reference potential, all of the transistors are nonconductive and a negative character-identifying output signal appears at terminal 82*k*. Inhibiting diodes 253, 254, and 255 constantly examine the potentials at taps *o, c,* and *g* respectively, to inhibit the character-identifying output at (82)*l* whenever either the potential at tap *o* is negative or either of the potentials at taps *c* and *g* are positive.

Thus, in accordance with the present invention, there has been disclosed a novel self-clocking direct-character recognition apparatus which is extremely simple, yet highly effective in selectively identifying a plurality of intermixed recorded characters without the need for externally generated synchronizing and timing signals of any kind and is readily adaptable for incorporation in present-day computers and data processors. While the form of apparatus herein shown and described is admirably adapted to fulfill the objects primarily stated, it is to be understood that it is not intended to confine the invention to the form or embodiment herein disclosed, for it is obviously susceptible of embodiment in various other forms by a person skilled in the art after possessing a full understanding of the teachings of the present invention. For example, various other variable reluctance and optical type read heads may obviously be utilized with equal success as well as a multitude of other types.

What is claimed is:

1. Apparatus for selectively identifying a plurality of recorded characters, comprising:

character-sensing means responsive to any one of said characters for generating an electrical signal having a wave-shape characteristic representative of a corresponding character;

sampling means coupled to said generating means for receiving said signal and for dispensing samples thereof to produce distinctive potentials representative of said samples at a plurality of output-sampling points of said sampling means;

and a plurality of character-identifying means, each related to a different one of said characters, each of said character-identifying means including a collating network coupled to a different combination of selected output-sampling points of said sampling means for comparing the potentials at said selected output-sampling points with respect to one another, whereby whenever the potentials at the selected output-sampling points coupled to a collating network correspond to the potentials expected from the character associated with that collating network, a predetermined potential state is manifest at the output of that collating network, and a separate detector device connected to the output of each collating network responsive only to said predetermined potential state whereby a character-identifying output signal is produced from only that detector device associated with the collating network corresponding to the character sensed.

2. Apparatus for selectively identifying a plurality of recorded characters, comprising:

means sequentially responsive to said characters for generating a sequence of electrical signals, the characteristic wave-shape of each of said signals exhibiting a plurality of positive and negative potential excursions collectively representative of a corresponding character;

storage means coupled to said generating means for sequentially receiving said signals one after the other, and for dispensing positive and negative potential samples of said excursions of each of said signals at a plurality of output points of said storage means;

and a plurality of character-identifying means, each related to a different one of said characters, each of said character-identifying means including a collating network coupled to a different combination of selected output points of said storage means for comparing only said positive potential samples with respect to said negative potential samples, whereby whenever the potential samples at the selected output points coupled to a collating network correspond to the potential samples expected from the character associated with that collating network, a predetermined potential state is manifest at the output of that collating network, and a separate detector device connected to the output of each collating network responsive only to said predetermined potential state, whereby a character-identifying output signal is produced from only that detector device associated with the collating network provided for a particular character.

3. Apparatus for selectively identifying a plurality of recorded characters, comprising:

means sequentially responsive to said characters for generating a sequence of electrical signals, the characteristic wave-shape of each of said signals exhibiting a plurality of positive and negative potential excurisons collectively representative of a corresponding character;

storage means coupled to said generating means for sequentially receiving said signals one after the other, and for dispensing positive and negative potential samples of said excursions of each of said signals at a plurality of output points of said storage means;

and a plurality of character-identifying means, each related to a different one of said characters, each of said character-identifying means including a collating network coupled to a different combination of selected output points of said storage means for comparing only said positive and negative potential samples with respect to a reference potential, whereby a character-identifying output signal is produced from only that detector device associated with the collating network provided for a particular character.

4. Appartus for selectively identifying a plurality of recorded characters, comprising:

means sequentially responsive to said characters for generating a sequence of electrical signals, each signal having a wave-shaped characteristic respectively representative of a corresponding character;

a multi-section delay line coupled to said generating means for sequentially receiving said signals one after the other, said delay line having a plurality of similar serially-connected delay sections for dispensing samples of each of said signals to produce distinctive potentials representative of said samples at output-sampling points of said delay sections;

and a plurality of character-identifying means, each related to a different one of said characters, each of said character-identifying means including a collating network coupled to a different combination of selected output-sampling points of said delay sections for comparing the potentials at said output-sampling points with respect to one another, whereby whenever the potentials at the selected output-sampling points coupled to a collating network correspond to the potentials expected from the character associated with that collating network, a predetermined potential state is manifest at the output of that collating network, and a separate detector device connected to the output of each collating network responsive only to said predetermined potential state, whereby a character-identifying output signal is produced from only that detector device associated with the collating network provided for a particular character.

5. Apparatus for selectively identifying a plurality of recorded characters, comprising:

character-sensing means responsive to any one of said characters for generating an electrical signal having a wave-shape characteristic representative of a corresponding character;

a first and a second plurality of output lines;

a first sampling means coupled to said generating means for receiving said signal and providing samples thereof at a plurality of time-base intervals to produce distinctive potentials representative of said samples at said first plurality of output lines;

a second sampling means coupled to said generating means for receiving said signal and providing additional samples thereof at a plurality of time-base intervals intermediate the time-base intervals of the samples provided by said first sampling means to produce distinctive potentials repsesentative of said additional samples at said second plurality of output lines;

and a plurality of character-identifying means, each related to a different one of said characters, each of said character-identifying means including a collating network coupled to a different combination of selected first and second output lines for comparing the potentials at said selected first and second output lines with respect to one another, whereby whenever the potentials at the selected first and second output lines coupled to a collating network correspond to the potentials expected from the character associated with that collating network, a predetermined potential state is manifest at the output of that collating network, and a separate detector device connected to the output of each collating network responsive only to said predetermined potential state whereby a character-identifying output signal is produced from only that detector device associated with the collating network corresponding to the character sensed.

6. Apparatus for selectively identifying a plurality of recorded characters, comprising:

character-sensing means responsive to any one of said characters for generating an electrical signal having a wave-shape characteristic representative of a corresponding character;

a first multi-section delay line coupled to said generating means, and having a plurality of serially-connected delay sections and a tap point intermediate each pair of adjacent delay sections, for receiving said signal and indivdually dispensing samples thereof at a plurality of time-base intervals to produce distinctive potentials representative of said samples at said tap points of said first delay line;

a second multi-section delay line coupled to said generating means and having a plurality of serially-connected delay sections and a tap point intermediate each pair of adjacent delay sections, for receiving said signal and individually dispensing additional samples thereof at a plurality of time-base intervals intermediate the time-base intervals of the samples provided by said first delay line to produce distinctive potentials representative of said additional samples at said tap points of said second delay line;

and a plurality of character-identifying means, each related to a different one of said characters, each of said character-identifying means including a collating network coupled to a different combination of selected tap points of said first and second delay lines for comparing the potentials of said selected tap points with respect to one another, whereby whenever the potentials at the selected tap points coupled to a collating network correspond to the potentials expected from the character associated with that collating network, a predetermined potential state is manifest at the output of that collating network, and a separate detector device connected to the output of each collating network responsive only to said predetermined potential state whereby a character-identifying output signal is produced from only that detector device associated with the collating network corresponding to the character sensed.

References Cited

UNITED STATES PATENTS

| | | | |
|---|---|---|---|
| 2,947,971 | 8/1960 | Glauberman et al. | 340—146.3 |
| 3,000,000 | 9/1961 | Eldredge | 340—146.3 |
| 3,008,123 | 11/1961 | Rohland et al. | 340—146.3 |
| 3,038,069 | 6/1962 | Tuller | 324—77 XR |
| 2,911,472 | 11/1959 | Griffith | 178—34 |
| 2,898,576 | 8/1959 | Bozeman | 340—146.3 |
| 2,752,489 | 6/1956 | Aigrain | 328—146 |

FOREIGN PATENTS

| | | |
|---|---|---|
| 785,853 | 11/1957 | Great Britain. |

OTHER REFERENCES

Eldredge et al.: Proceedings of the E.J.C.C., Dec. 11, 1956, pp. 69–73 relied on.

"Teaching Machines to Read" by Eldredge, Kamphofner and Wendt, SRI Journal, pp. 18–23, First Quarter 1957.

MAYNARD R. WILBUR, *Primary Examiner.*

U.S. DEPARTMENT OF COMMERCE

PATENT OFFICE

Washington, D.C. 20231

UNITED STATES PATENT OFFICE

CERTIFICATE OF CORRECTION

Patent No. 3,439,337 April 15, 1969

Cebern B. Trimble

It is certified that error appears in the above identified patent and that said Letters Patent are hereby corrected as shown below:

Column 1, line 60, "equeeze-out" should read -- squeeze-out --. Column 2, line 37, after "also" insert -- required the generation and utilization of stringent syn- --.

Signed and sealed this 14th day of April 1970.

(SEAL)
Attest:

Edward M. Fletcher, Jr.
Attesting Officer

WILLIAM E. SCHUYLER, JR.
Commissioner of Patents